US012712367B2

(12) United States Patent
Richmond et al.

(10) Patent No.: US 12,712,367 B2
(45) Date of Patent: Aug. 18, 2026

(54) METHODS AND SYSTEMS FOR CONDITIONING AND MAINTAINING POWER TRANSMITTED TO A CUSTOMER LOAD FROM AT LEAST ONE OF A PRIMARY POWER SUPPLY AND A SECONDARY POWER SUPPLY

(71) Applicant: E2 IP HOLDING LLC, Bonita Springs, FL (US)

(72) Inventors: James Richmond, Estero, FL (US); Scott Gall, Bonita Springs, FL (US); Timothy Richmond, Estero, FL (US)

( * ) Notice: Subject to any disclaimer, the term of this patent is extended or adjusted under 35 U.S.C. 154(b) by 379 days.

(21) Appl. No.: 18/358,822

(22) Filed: Jul. 25, 2023

(65) Prior Publication Data

US 2023/0369862 A1 Nov. 16, 2023

Related U.S. Application Data

(63) Continuation-in-part of application No. 18/090,210, filed on Dec. 28, 2022, now abandoned, which is a continuation of application No. PCT/US2021/039708, filed on Jun. 29, 2021.

(60) Provisional application No. 63/060,740, filed on Aug. 4, 2020, provisional application No. 63/045,535, filed on Jun. 29, 2020.

(51) Int. Cl.

| | |
|---|---|
| ***H02J 3/32*** | (2026.01) |
| ***H02J 3/0012*** | (2026.01) |
| ***H02J 3/01*** | (2026.01) |

(52) U.S. Cl.

CPC .............. *H02J 3/32* (2013.01); *H02J 3/0012* (2020.01); *H02J 3/01* (2013.01)

(58) Field of Classification Search

CPC .... H02J 3/0012; H02J 3/01; H02J 3/32; H02J 9/062; H02J 2203/10; H02J 2203/20; H02J 3/001; H02J 3/003

See application file for complete search history.

(56) References Cited

U.S. PATENT DOCUMENTS

| | | | | |
|---|---|---|---|---|
| 11,283,290 | B2 | 3/2022 | Richmond et al. | |
| 2017/0366038 | A1* | 12/2017 | Qin | H02J 7/35 |
| 2019/0273382 | A1* | 9/2019 | Zhang | H02J 3/381 |

(Continued)

FOREIGN PATENT DOCUMENTS

| | | | |
|---|---|---|---|
| WO | 2022173824 | A1 | 8/2022 |

*Primary Examiner* — Tameem D Siddiquee

(74) *Attorney, Agent, or Firm* — Derek Fahey, Esq.; The Plus IP Firm, PLLC

(57) ABSTRACT

A method for conditioning and maintaining power transmitted to a customer load from a primary or secondary power supply is disclosed. The method includes receiving a first input from the power supply, converting the first input using a converter, and continuously adjusting at least one converter power parameter to satisfy at least one inverter power parameter. The method determines whether the first output transmitted from the converter to an inverter satisfies the at least one inverter power parameter. If the output satisfies the inverter power parameter, then power is supplied to the customer load without charging or discharging a high discharge battery stack. The method also includes monitoring primary power supply parameters and switching to the secondary power supply if the primary power supply parameter fails to satisfy the respective primary power supply parameter threshold.

21 Claims, 15 Drawing Sheets

(56) References Cited

U.S. PATENT DOCUMENTS

| | | | | |
|---|---|---|---|---|
| 2020/0290475 | A1* | 9/2020 | Ogawa | B60L 53/63 |
| 2020/0313437 | A1* | 10/2020 | Santi | H02J 3/32 |

* cited by examiner

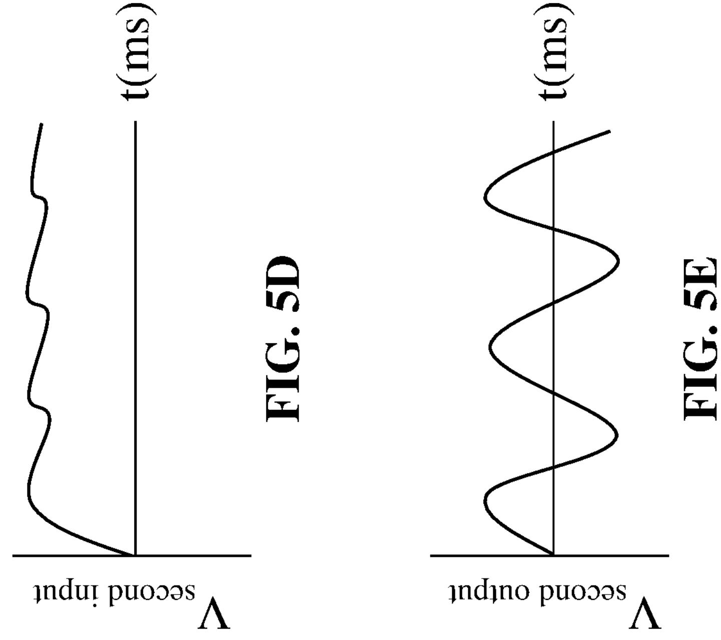
FIG. 5D
FIG. 5E
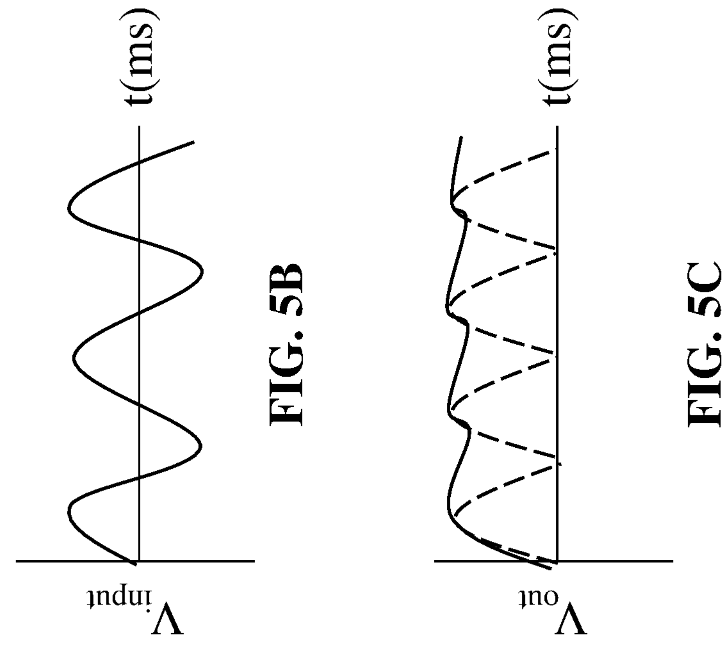
FIG. 5B
FIG. 5C

METHODS AND SYSTEMS FOR CONDITIONING AND MAINTAINING POWER TRANSMITTED TO A CUSTOMER LOAD FROM AT LEAST ONE OF A PRIMARY POWER SUPPLY AND A SECONDARY POWER SUPPLY

REFERENCE TO RELATED APPLICATIONS

This application is a continuation in part application of U.S. application Ser. No. 18/090,210 titled "Apparatus, Systems, and Methods for Providing a Rapid Threshold Amount of Power to a Customer Load During Transfer Between a Primary Power Supply" and filed Dec. 18, 2022 which is a continuation of PCT/US21/39708 titled "Apparatus, Systems, and Methods for Providing a Rapid Threshold Amount of Power to a Customer Load During Transfer Between a Primary Power Supply and a Secondary Power Supply" and filed Jun. 29, 2021, the subject matter of each is hereby incorporated herein by reference.

PCT/US21/39708 claims the benefit of the filing dates of U.S. Provisional Appl. Ser. No. 63/045,535 titled "Apparatus, Systems, and Methods for Providing a Rapid Threshold Amount of Power to Large Loads During Transfer Between Power Supplies" having a filing date of Jun. 29, 2020, and U.S. Provisional Appl. Ser. No. 63/060,740 titled "Apparatus, Systems, and Methods for Providing a Rapid Threshold Amount of Power to Large Loads During Transfer Between Power Supplies" having a filing date of Aug. 4, 2020 and the subject matter of which is incorporated herein by reference.

CROSS-REFERENCES

This application has a cross-referenced relation to U.S. Non-Provisional patent application Ser. No. 17/362,766, now patented as U.S. Pat. No. 11,283,290 and issued Mar. 22, 2022, which was a parallel application to the PCT/US21/39708 filed on Jun. 29, 2021, and the subject matter of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISK

Not applicable.

TECHNICAL FIELD AND BACKGROUND OF THE INVENTION

The present invention relates to power conversion systems, and more particularly to systems for conditioning, maintaining, and restoring power transmitted to a load in a reliable and efficient manner. The invention is particularly relevant to microgrid systems, which are islands formed at a facility or in an electrical distribution system configured to facilitate penetration of distributed resources and associated loads, and also improve the security of power supplies.

Existing power conversion systems, including those used in microgrids, can face a variety of issues that limit their reliability and efficiency. One common issue is that these systems are often neither modular nor scalable, requiring considerable time and labor for installation and making it difficult to reconfigure the system for different applications. Additionally, current energy storage systems associated with microgrids lack the ability to support power mechanisms configured to function at high performance and high discharge rates, limiting their effectiveness in critical applications.

Another issue with existing systems is the potential for downtime and interruption to the load in the event of a power outage or other disruption to the primary power source. This can be particularly problematic in mission critical facilities, such as hospitals, nursing homes, and data centers, where downtime can have profound consequences for patient health and safety, data integrity, and other critical operations. Existing standby power systems, such as generators, can face design, capacity, and maintenance issues, limiting their effectiveness as backup power sources.

Moreover, microgrid systems face specific challenges related to their integration into electrical systems. These systems seek to promote sustainability and reliability while supporting an interconnected configuration, but often face limitations in their ability to regulate voltage and power flow to the load in an efficient and reliable manner, particularly when multiple power sources are involved. This can result in fluctuations in power quality and reliability, as well as increased energy consumption and costs.

Therefore, there is a need for a power conversion system that can overcome these issues and provide reliable and efficient power to a load, particularly in critical applications such as microgrids and mission critical facilities.

BRIEF SUMMARY OF THE INVENTION

A system and method for conditioning and maintaining the power transmitted to a customer load from at least one of a primary power supply and a secondary power supply is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

The present disclosure relates to a method for conditioning and maintaining power transmitted to a customer load from at least one of a primary power supply and a secondary power supply. The method includes receiving a first input from at least one of the primary power supply and the secondary power supply, and converting the first input to a first output using a converter. At least one converter power parameter is continuously adjusted to satisfy at least one inverter power parameter. It is then determined whether the first output transmitted from the converter to an inverter satisfies the at least one inverter power parameter. If so, then at least one high discharge battery stack is not charged or discharged. A second input is converted to a second output using the inverter, and power is supplied to the customer load.

The disclosure includes various aspects such as monitoring primary power supply parameters, adjusting converter power parameters, and determining whether the primary power supply parameters fail to satisfy respective thresholds. The disclosure also includes switching to the secondary power supply if the primary power supply parameters fail to satisfy respective thresholds. The high discharge battery stack can be electrically connected between the converter and the inverter and can have at least 860 volts of nominal voltage and at least 3 C. The disclosure further includes generating a graphical display comprising real-time monitoring of power supply parameters and receiving signals from at least one sensor or a remote processor. The disclosure can also include transmitting power across a first isolation transformer to the converter, then to the inverter, and then across a second isolation transformer to the customer load.

More specifically, in another embodiment, a method for conditioning and maintaining the power transmitted to a customer load from at least one of a primary power supply and a secondary power supply. The method includes receiving an AC voltage from the power supply and converting it to DC voltage using a first inverter. The DC voltage set point of the first inverter is continuously adjusted to satisfy at least one second inverter power parameter. The method also includes determining if the DC voltage transmitted from the first inverter to the second inverter satisfies the at least one second inverter power parameter. The at least one high discharge battery stack is discharged if the DC voltage transmitted fails to satisfy the at least one second inverter power parameter, not charged or discharged if the DC voltage satisfies the at least one second inverter power parameter, or charged if the DC voltage transmitted more than satisfies the at least one second inverter power parameter. The method also includes supplying power to the customer load across a third gate and switching from the primary power supply to the secondary power supply after the at least one processor determines that at least one primary power supply parameter fails to satisfy the respective primary power supply parameter threshold.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein:

FIG. 5B through 5E illustrates the first input, first output, second input and second output, respectively, according to an example embodiment.

DETAILED DESCRIPTION

Figure 1:
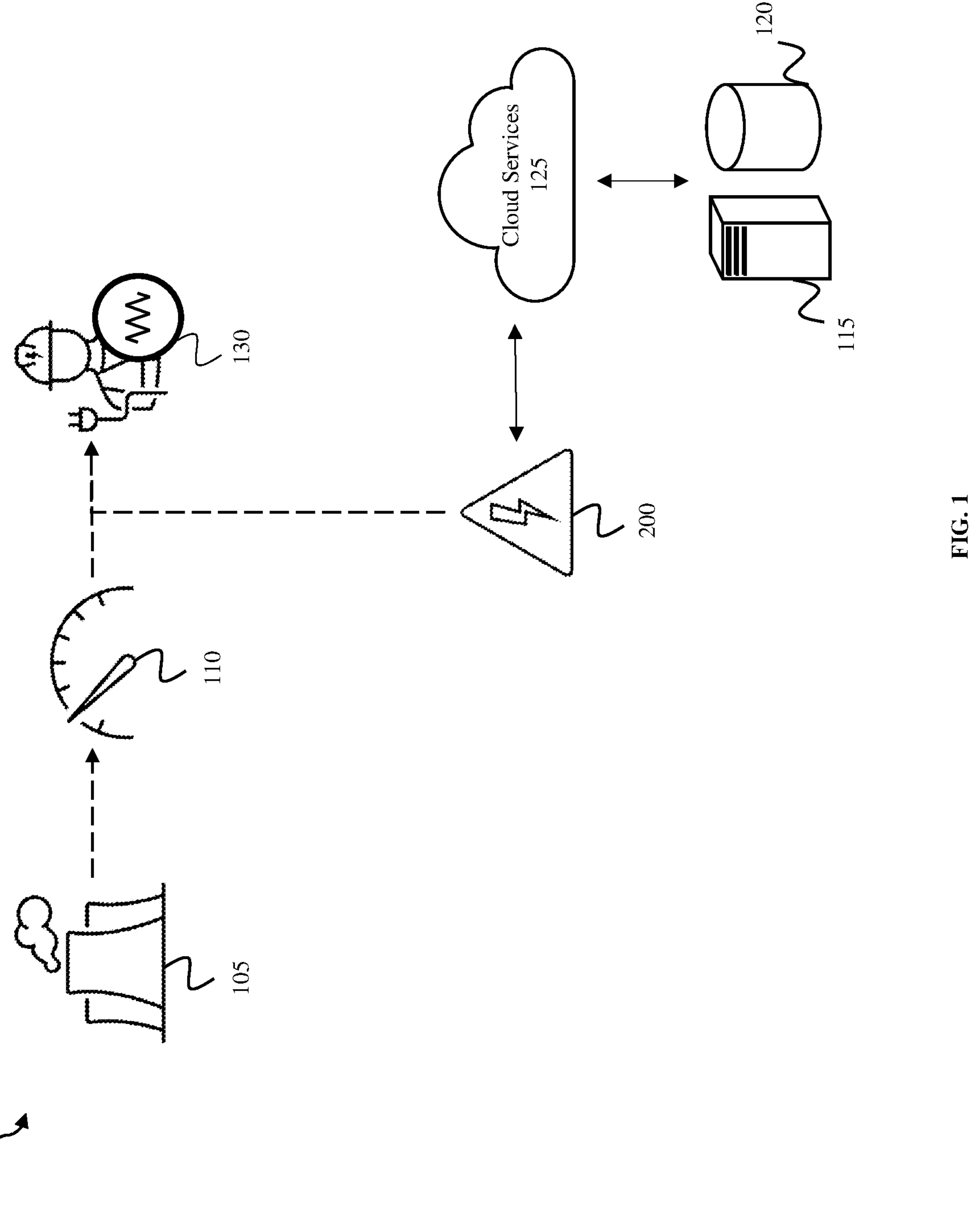
FIG. 1 illustrates a diagram of an operating environment that supports a system for providing a rapid threshold amount of power to customer loads during transfer between a primary power supply and a secondary power supply, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional steps or components to the disclosed methods and devices. Accordingly, the following detailed description does not limit the disclosed embodiments. Instead, the proper scope of the disclosed embodiments is defined by the appended claims.

The disclosed embodiments offer a number of improvements over prior art. Firstly, the system provides continuous power to the customer load, without any downtime or disruption, even during a power outage or when transitioning between primary and secondary power sources. Secondly, the system allows for high-performance, high-discharge energy storage systems, which are able to provide power to mission-critical facilities that require stable and reliable standby power sources that are conditioned from voltage spikes resulting in clean energy. Thirdly, the system is modular and scalable, allowing for easy installation and reinstallation of energy storage inverters in alternative systems. Fourthly, the system utilizes a unique method for charging and discharging the energy storage system, which prevents the battery from being in a constant state of charging and discharging. Finally, the system offers improved efficiency and stability over prior art by continuously adjusting the DC voltage set point of the first inverter s to satisfy at least one second inverter power parameter, thereby ensuring that power is always available to the customer load.

The present disclosure specifically improves over the prior art by providing a system that can condition, maintain, and restore power to the load in a reliable and efficient manner, even in the event of a power outage or other disruption to the primary power source because current systems often face limitations in their ability to regulate voltage and power flow to the load in an efficient and reliable manner, particularly when multiple power sources are involved. The methods and systems herein are designed to incorporate multiple power sources and to regulate voltage and power flow to the load in a seamless and efficient manner, using a variety of control and feedback mechanisms to ensure optimal performance under a wide range of operating conditions to solve problems in the prior art which result in fluctuations in power quality and reliability, as well as increased energy consumption and costs.

Moreso, the disclosed embodiments improve upon the problems with the prior art by providing a rapid threshold amount of power to a customer load during transfer between a primary power supply and a secondary power supply. The system improves upon the prior art by having a secondary power supply source and an energy storage system. Specifically, the energy storage system is in electrical communication with the secondary power supply source. The system improves upon the prior art because the energy storage system comprises a high discharge battery and is configured to rapidly discharge power to the customer load with essentially a 'zero' down-time recovery. The switching module includes at least one set of contacts in communication with at least one inverter of the energy storage system. The switching module improves upon the prior art by switching to the energy storage system where the system maintains hot voltage lines in communication with the customer load such that the system provides a rapid threshold amount of power to a customer load during transfer between a primary power supply and a secondary power supply.

Referring now to the Figures, FIG. 1 is an operating environment 100 for system 200 and method (300 in FIG. 3) for conditioning and maintaining power transmitted to a customer load from at least one of a primary power supply and a secondary power supply, according to an example embodiment. The operating environment 100 that supports the system 200 includes a primary power supply 105 connected to a meter 110, the system 200 connected to a customer load 130, and the system 200 in communication with cloud services 125 where the cloud services may include communication with at least one server 115 and at least one database 120.

It is understood that cloud services may include a communications network. Communications network may include one or more packet switched networks, such as the Internet, or any local area networks, wide area networks, enterprise private networks, cellular networks, phone networks, mobile communications networks, or any combination of the above.

The server 115 may include a software engine that delivers applications, data, program code and other information to networked devices. The software engine of server may perform other processes such as transferring multimedia data in a stream of packets that are interpreted and rendered by a software application as the packets arrive. FIG. 1 further shows that server 115 includes a database or repository 120, which may be a relational database comprising a Structured Query Language (SQL) database stored in a SQL server or a database that adheres to the NoSQL paradigm. It is understood that other components of the system may also include databases.

The primary power supply generally includes electrical utility power from a power plant deriving its energy from a variety of sources including, but not limited to, nuclear energy, coal, natural gas, fossil fuel, solar, and wind energy. Transformers, sub stations, power generation plants, utility transmission systems, feeder systems and other utility power supply components may also be included in the primary power supply or primary power supply grid. The primary power supply 105 is usually maintained and operated by local and national regulatory authorities. The primary power source is connected to meter 110 which is configured to measure the amount of electricity distributed to the customer. There are two connection points on the meter, including the connection to the primary power supply and the connection that leads to distribution to the customer load 130. In one embodiment, the customer load is at least five hundred kilowatts.

The meter is usually owned by the utility company operating the primary power source, and it is also responsible for installing, maintaining, and reading the meter. Thus, any connections on the primary power supply side of the meter by anyone other than the utility company is considered tampering. Therefore, system 200 is connected on the customer side of the meter. The meter used herein may include a metering system. A meter is a device or system that measures the amount of electric energy consumed by a residence, a business, or an electrically powered device. Large commercial and industrial premises may use electronic meters which record power usage in blocks of half an hour or less. These meters may be confirmed to measure one, two or three phase power. The meters may include digital meters and metering systems, smart meters and metering systems, electronic meters and metering systems, electromechanical meters and metering systems, accumulation meters and metering systems, interval meters and metering systems, industrial flow measurement meters, metered rooms, and vault meter systems. However, it is understood that other types of metered systems may be used and are within the spirit and scope of the present invention.

On the customer side of the meter, system 200 is connected to the customer load 130. The customer load 130 is generally a residential home, industrial building, or commercial building, each including electronic and appliances that require electrical power to operate. The system is in further communication with cloud services 125 which may include communication to a network. In one embodiment, system 200 may include a network and at least one processer in communication with cloud services 125. Cloud services may include different types of cloud computing systems. The cloud services may include at least one server 115, databases 120, remote processors, computing power, on-demand accessibility functions, and user interfaces without the direct active management by a user. In one embodiment, a network may include both the software and the hardware composing the system. The hardware may include computer electronic devices such as cables, switches, access points, modems, and routers, while the software may include operating systems, applications, firewalls, and the like. The components of system 200 are communicatively interacting with cloud services 125 and the network.

The operating environment for the system may include a wide range of industrial and commercial settings where reliable backup power is essential. For example, the system may be used in telecommunications facilities, data centers, power plants, medical facilities, transportation systems, military operations, and other applications where uninterrupted power supply is necessary.

In one embodiment, the system may be designed to operate in a temperature range of −20° C. to 50° C. with a humidity range of 0% to 90%. The system may also be designed to operate in harsh environmental conditions such as high altitude, extreme temperatures, high levels of dust or other particulate matter, and exposure to chemicals or other hazardous materials.

The system may also be designed for easy installation and maintenance in various operating environments. For example, the system may include modular components that can be easily replaced or upgraded as needed and may have a user-friendly interface for monitoring and controlling the system's performance. Additionally, the system may have built-in diagnostic capabilities for detecting and troubleshooting any issues that may arise during operation, as well as the ability to send alerts and notifications to operators or maintenance personnel.

In some embodiments, the system may also be designed for mobile or remote deployment, such as in disaster response scenarios, military operations, or other applications where portable power is necessary. The system may be compact, lightweight, and durable for easy transportation and deployment in these environments.

Figure 2:
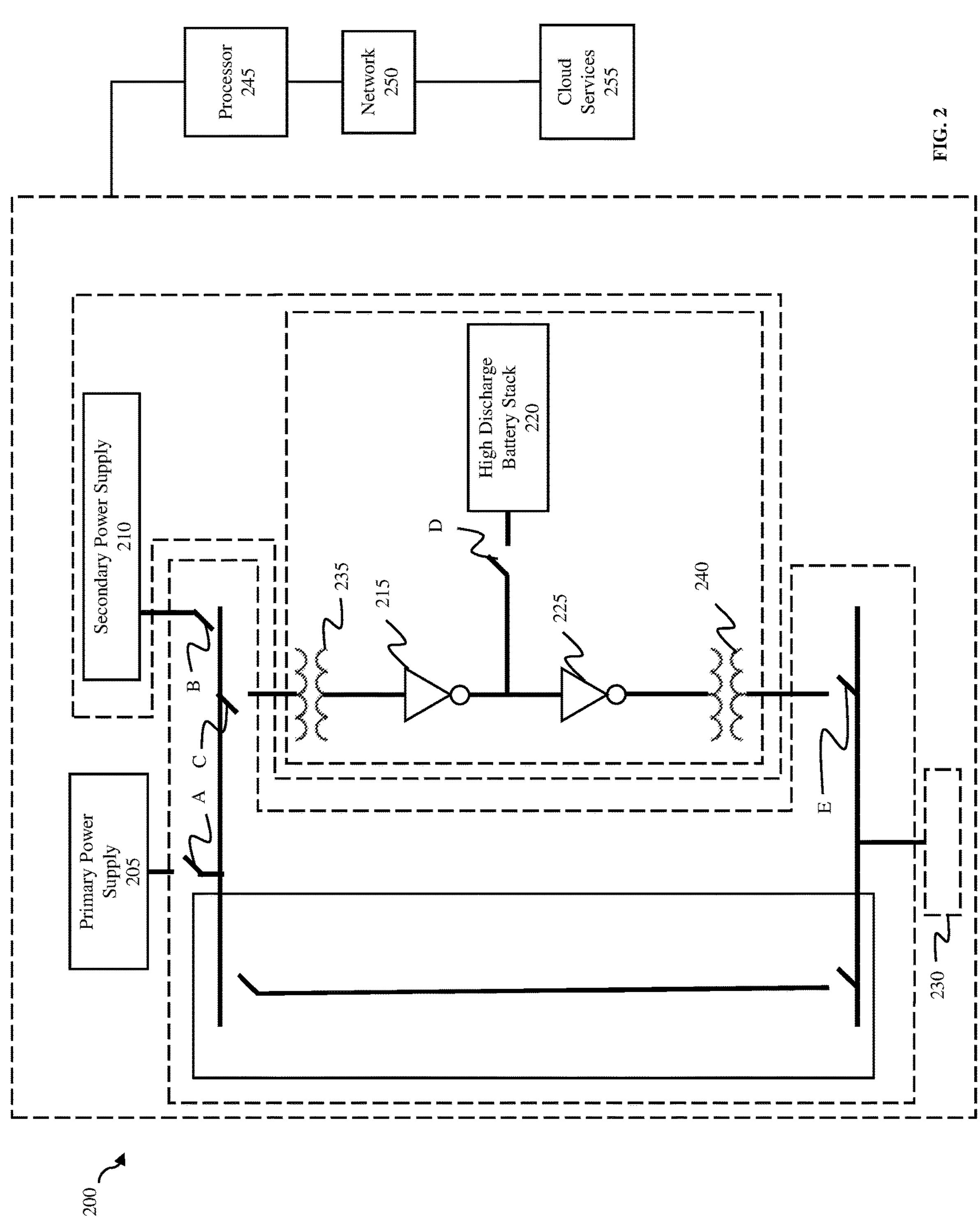
FIG. 2 is a system for conditioning and maintaining power transmitted to a customer load from at least one of a primary power supply and a secondary power supply, according to an example embodiment.

Referring now to FIG. 2, a power conditioning and maintenance system 200 is provided for conditioning and maintaining power transmitted to a customer load from at least one of a primary power supply and a secondary power supply. The disclosed system includes several interconnected elements that work together to provide reliable and efficient power delivery. The system includes a primary power supply 205, which may be connected to the electrical grid, and a secondary power supply 210, such as a backup generator or renewable energy source. The system further comprises a converter 215, which is configured to receive inputs from the primary and/or secondary power supplies and convert the power into a suitable form for delivery to the customer load 230. The converter may also include monitoring and control circuits to ensure that the power is delivered efficiently and safely. In addition, the system includes at least one high discharge battery stack 220, which is configured to store excess power from the primary and/or secondary power supplies and discharge the stored energy during periods of high demand. The battery stack may also be used as a backup power source in the event of a power outage or other interruption to the primary power supply. The power output from at least one of the converter or the at least one high discharge battery stack is then transmitted to an inverter 225 and then to the customer load 230.

In some embodiments, the primary power supply may be a utility power supply, which may be unreliable and have power that is subject to voltage spikes, noise, and other issues. Such a power supply may cause damage to the electrical devices and systems connected to it, resulting in the malfunctioning of these systems. To address this issue, the present system may include at least one isolation transformer, such as first isolation transformer 235 and second isolation transformer 240 that helps to provide clean power by isolating the customer load from the primary power supply. The first isolation transformer is electrically connected between the converter and at least one of (i) the primary power supply and (ii) the secondary power supply.

The isolation transformer can remove any electrical noise or voltage spikes that may be present in the primary power supply, thereby ensuring that the customer load is not affected by any such fluctuations in the power supply. This can help to ensure the smooth and uninterrupted operation of the customer load, while also protecting it from any potential damage due to voltage spikes or other issues that may be present in the primary power supply. An isolation transformer is a type of transformer that is designed to transfer electrical power from a source of alternating current (AC) power to a device or circuit while providing electrical isolation between the two. It works by using two separate coils of wire, one for the input and one for the output, which are wound on a common magnetic core. The primary coil is connected to the source of AC power, while the secondary coil is connected to the device or circuit that needs power. The two coils are electrically isolated from each other, meaning that there is no direct electrical connection between the primary and secondary sides of the transformer. This allows for electrical isolation and can help protect against electrical shocks, reduce electrical noise, and prevent ground loops. Isolation transformers can also be used to step up or step-down voltage levels, depending on the number of turns in the primary and secondary coils.

The system may further include at least one processor, such as remote processor 245, which may be a microprocessor, a digital signal processor (DSP), a field programmable gate array (FPGA), an application specific integrated circuit (ASIC), or any other suitable computing device. The processor may be programmed to perform various functions, such as monitoring primary power supply parameters, determining whether a primary power supply parameter threshold is satisfied, controlling the operation of the switch gates, and performing other necessary computations to ensure proper operation of the system. The processor may be connected to other components of the system via one or more communication buses and may be programmed using any suitable programming language or development environment. In some embodiments, the processor may be remotely located and communicate with the system via a network connection, such as a local area network (LAN), a wide area network (WAN), or the Internet. Processor 245 may be configured to receive real-time input on the status of the primary power supply and communicate with the converter to adjust power delivery as needed. Together, these elements provide a robust and flexible power delivery system that can meet the needs of a wide range of applications and operating environments.

In some embodiments, the system includes at least one processor that is connected to a network 250 and cloud services 255. The at least one processor may be connected to the network via any suitable means, such as a wired or wireless connection, and may be configured to communicate with other devices and systems on the network. The cloud services may be accessed via the network and may provide a variety of services, such as data storage, processing, and analysis, as well as remote access to the system and its components. The at least one processor may be configured to communicate with the cloud services and may utilize the services to perform various functions, such as data analysis and system monitoring. In some embodiments, the at least one processor may include one or more microprocessors, microcontrollers, or other computing devices, and may be programmed with software or firmware to perform various functions related to the operation and control of the system. The at least one processor may also be connected to various sensors, data sources, and other components of the system to facilitate data collection, processing, and analysis.

Connecting the system to a network and/or cloud services can provide numerous benefits such as remote monitoring, data analysis, and control. It allows for real-time monitoring of the system's performance and health, which can help detect and prevent potential issues. Additionally, cloud services can provide access to large-scale computing power, enabling advanced data analysis and machine learning algorithms to optimize system performance and energy efficiency. The network connection can also facilitate communication and coordination between multiple systems, allowing for better overall management and control of the power distribution network.

In certain embodiments, the system includes a plurality of switch gates defining a switching module, such as switch gate A, switch gate B, switch gate C, switch gate D, and switch gate E, according to an example embodiment. If the first input is received at the converter from the primary power supply, then the method disclosed herein includes transmitting power across a first switch gate A, which is normally closed, across a third switch gate C, across a first isolation transformer to the converter, then to the inverter, and then across a second isolation transformer and a fifth switch gate E to the customer load.

If the first input is received at the converter from the secondary power supply, then the method includes closing a second switch gate B thereby electrically connecting the secondary power supply to the converter and adjusting the at least one converter power parameter such that power is transmitted from the secondary power supply to the converter to the at least one high discharge battery stack for charging the at least one high discharge battery. The at least one high discharge battery stack is discharged to the inverter and power is transmitted to the customer load. In certain embodiments, the high discharge battery stack is connected between the converter and the inverter by switch gate D, which is normally closed.

Within the system, certain switches act as maintenance switch gates to disconnect certain electrical components from the system to isolate other components and/or perform maintenance on the system. For example, switch gates C, D, and E are all maintenance switch gates to respectively isolate the power supplies and/or the load from the energy storage system and/or isolate the at least one high discharge battery stack.

A switch gate, as used in the present disclosure, refers to an electronic component that can be used to control the flow of electrical current in a circuit. The switch gate can be configured to allow current to flow through the circuit when it is closed and to interrupt the flow of current when it is opened. The switch gate can be controlled by an electronic signal, such as a voltage or current signal, to selectively turn it on or off. In various embodiments, the switch gate can be implemented using a transistor, a relay, or any other suitable electronic component capable of selectively controlling the flow of electrical current in a circuit.

Figure 3:
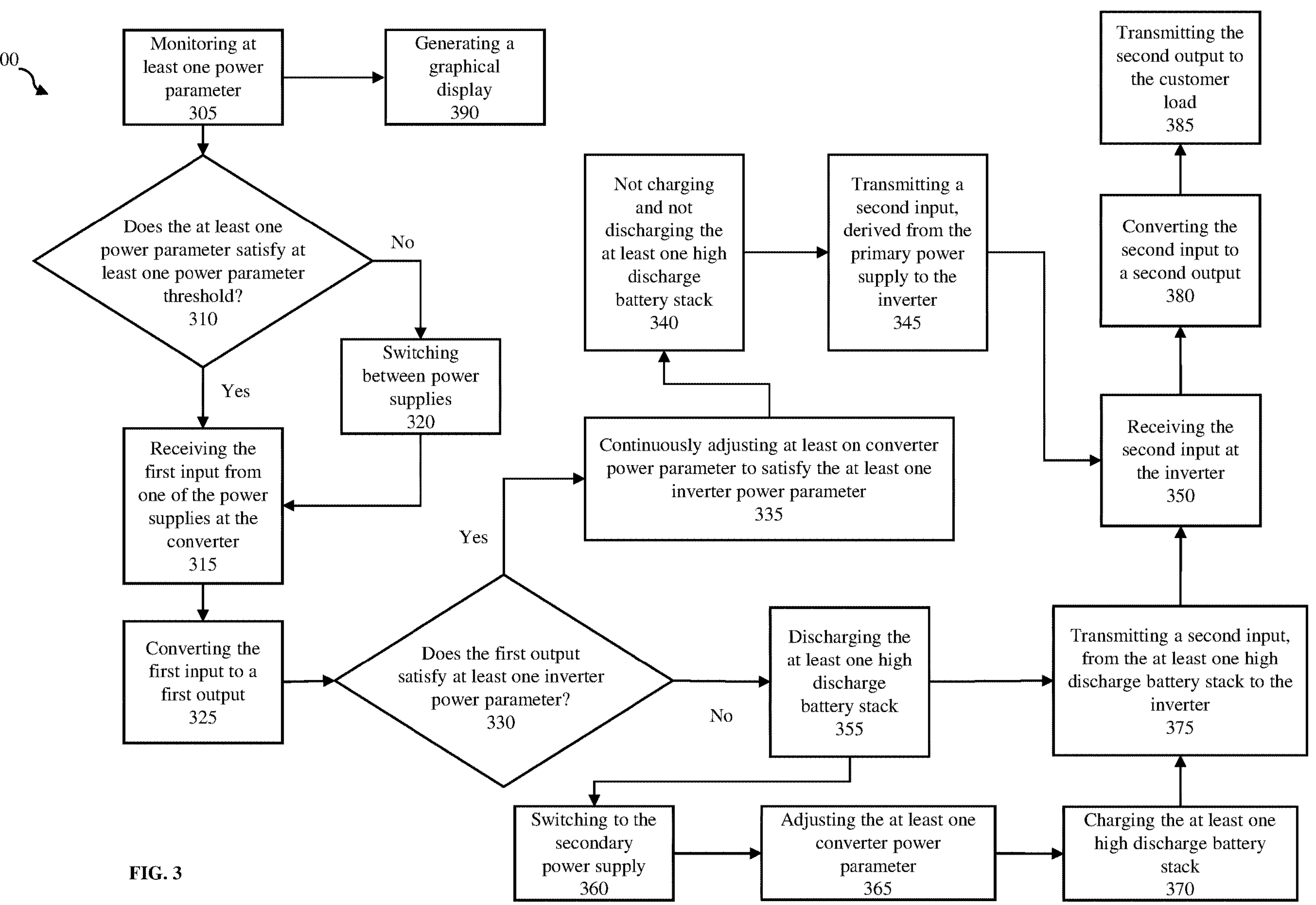
FIG. 3 is a box-diagram of a method for conditioning and maintaining power transmitted to a customer load from at least one of a primary power supply and a secondary power supply, according to an example embodiment.

Referring now to FIG. 3, a box-diagram of a method 300 for conditioning and maintaining power transmitted to a customer load from at least one of a primary power supply and a secondary power supply is shown according to an example embodiment. It should be understood that the various steps of the method disclosed herein may be performed in any suitable order, either sequentially, simultaneously, or in any other suitable manner. Moreover, various embodiments of the invention may include fewer or additional steps or may incorporate substantially similar steps with different underlying details or parameters. Additionally, it should be understood that various embodiments of the invention may include one or more features or components that may be used independently of one another or in combination with other features or components. Furthermore, various modifications and substitutions may be made to the disclosed embodiments without departing from the scope of the invention. Therefore, the embodiments of the invention described herein are not intended to be limiting and are to be considered as merely illustrative of the invention as defined by the claims appended hereto.

In certain embodiments, it is important to note that certain steps within the method described above may interrupt or impact the progression of other steps. These interruptions may occur when specific conditions or criteria are met, allowing for temporary pauses or alterations in the overall sequence of operations. Such dynamic behavior enables the system to handle unexpected events, prioritize critical tasks over non-essential ones, and enhance overall operational efficiency.

In an example embodiment, method 300 includes monitoring, at step 305, at least one primary power supply parameter. The term primary power supply as used herein refers to a power source that is typically considered the primary source of power for a customer load. The primary power supply is a source of electrical power that is directly connected to the system for transmitting power to the customer load in a normal state of operation. The primary power supply may include any type of power source that provides electrical power, such as a utility grid, a generator, or a renewable energy system. This may include, for example, a power grid, a utility power source from a utility company, or other electrical power sources that are not considered to be backup power sources.

The system may include a monitoring system for monitoring at least one primary power supply parameter. The primary power supply parameter can be at least one of a voltage range, a frequency range, a power factor, a phase angle, a distortion presence, a distortion range, a cost for power, a time of day of power transmission, and an overall consumer demand level, total loss of power, and environmental gasses. The monitoring system may include a plurality of sensors configured to receive various signals within the system to determine the methods to perform herein.

In a particular embodiment, the primary power supply may include one or more transformers, inverters, or other components for converting and conditioning the electrical power before it is transmitted to the system. The primary power supply may also include one or more sensors or monitoring devices for measuring and transmitting real-time data on various power parameters, such as voltage, current, frequency, and power factor, to the system. The primary power supply parameter includes at least one of (i) a voltage range, (ii) a frequency range, (iii) a power factor, (iv) a phase angle, (v) a distortion presence, (vi) a distortion range, (vii) a cost for power, (viii) a time of day of power transmission, and (ix) an overall consumer demand level.

The primary power supply may be characterized by various primary power supply parameters, which are measurables of the signals of the primary power supply, including voltage, current, frequency, phase angle, power factor, and other power quality parameters. The primary power supply may also be subject to various external factors such as consumer demand, time of day, and cost of power.

In the example embodiment, step 310 includes determining whether at least one primary power supply parameter fails to satisfy a respective primary power supply parameter threshold. The primary power supply parameter threshold refers to a predetermined limit for one or more parameters associated with the primary power supply. The primary power supply parameter threshold can be a maximum or minimum value that is set based on the specifications of the system and the requirements of the customer load. Examples of primary power supply parameters that may have corresponding thresholds include voltage, frequency, and current. The primary power supply parameter thresholds can be set by a processor, either on the system or remotely, and can be adjusted based on the needs of the system or the customer load. The primary power supply parameter thresholds serve as a means for monitoring the primary power supply to ensure that it is operating within acceptable limits and for triggering corrective action if any parameter falls outside the established threshold.

If the at least one primary power supply parameter satisfies the respective primary power supply parameter threshold, then receiving, at step 315, at the converter a first input from the primary power supply. If a primary power supply parameter threshold is satisfied, it means that the measured value of the corresponding parameter of the primary power supply is within an acceptable range. The acceptable range can be pre-determined and set based on the specific parameter being monitored and the requirements of the system. If the measured value falls within this range, it is considered satisfactory, and the system can continue to operate normally. However, if the measured value falls outside of this range and does not satisfy the primary power supply parameter threshold, it may indicate a fault or potential issue with the primary power supply, and further action may be required such as switching to the secondary power supply or initiating a shutdown procedure to prevent damage to the system.

Similarly, if the at least one primary power supply parameter fails to satisfy the respective primary power supply parameter threshold, then receiving, at the converter, the first input from the secondary power supply. If a primary power supply parameter threshold is not satisfied or fails to satisfy the respective primary power supply parameter threshold, then it means that the parameter value has exceeded the predetermined threshold limit. This indicates that the primary power supply is not providing the required power parameter level, which can result in an unreliable or unstable power supply. In such a scenario, the system may trigger a corrective action, such as a switch to a secondary power supply, to ensure that the customer load is powered properly and without any interruption.

In certain embodiments, the method may include implementing artificial intelligence such that the system will utilize predictive analytics and data extrapolation to determine likelihoods of downstream electrical failure and/or a likelihood that the at least one power parameter will be outside the optimal threshold or range. Based on the projected electrical outcome, the system switches to the energy storage system, namely the at least one high discharge battery stack, prior to any respective power parameter failures or exceeded ranges.

The method may include utilizing an artificial intelligence and machine learning systems comprising a communications network, at least one processor, a neural network, and a connected to a database. The method may include storing information related to, including but not limited to, power supply parameters, historical system performance data, information relating to the components of the system and the downstream connections of the system, on the connected database. The artificial intelligence and machine learning systems may further comprises utilizing proprietary algorithms and the real-time transmission of information from upstream and downstream electrical systems. Upstream electrical systems refer to the components, devices, or circuits that come before a specific point in an electrical system's flow or direction. In the context of the present disclosure, upstream means on the utility side of the meter, namely, the primary power supply and/or the electrical grid closer to the initial power source or the point where the electrical energy is generated or supplied. Opposite, downstream electrical systems may include components, devices, or circuits that come after a specific point in an electrical system's flow or direction. In the context of the present disclosure, downstream refers to the electrical connection on the customer-side of the meter, namely the components of the system and/or the customer load.

At step 305, the system is monitoring the at least one power supply parameter. In certain embodiments, for example, the artificial intelligence system may calculate, using at least one proprietary algorithm, a projected amount of upstream environmental gases produced in the transmission of power. Environmental gases, in the context of energy generation and transmission, refers to the various gases emitted during the processes of power generation, transmission, and distribution that may have environmental impacts. These gases can include but are not limited to carbon dioxide (CO2), sulfur dioxide (SO2), nitrogen oxides (NOx), methane (CH4), and other pollutants released as byproducts of combustion or other energy generation methods. Environmental gases are of concern due to their contribution to climate change, air pollution, and their potential effects on human health and the environment. By predicting the environmental gasses used to generate the power needed for the system, the system may determine, during times when the environmental gas levels exceed a maximum threshold level, when to switch to an alternative power supply, namely, the at least one high discharge battery stack and the secondary power supply. The use of predictive analytics to monitor and manage environmental gases is a crucial aspect for sustainable energy practices and regulatory compliance in the energy sector.

Additionally, based on the at least one primary power supply parameter, the method may include simulating downstream effects on the system. As the system trains and updates a neural network, the system may determine peak times where primary power supply parameters are expected to exceed their respective ranges and thresholds. For example, the system may determine that the harmonics of the incoming power transmission are more likely to exceed the optimal or safe ranges during a certain time of day, weather conditions, or season. This would result in the system prematurely determining whether the primary power supply parameter and/or the first output will satisfy the at least one inverter power parameter, thereby predicting any potential downstream failures, inconsistencies, and inefficiencies of the system. Based on the simulation of the downstream electrical components, the system may activate the switching mechanism to isolate components and/or switch between power supplies before a downstream failure and/or inefficiency occurs. Another example includes training the neural network and artificial intelligence system to determine when the costs of the incoming transmission of power are expected to exceed the cost of utilizing the power of the energy storage system, namely, the at least one high discharge battery stack and the secondary power supply. The system may predict that, based on the monitored power supply parameters, that costs for utility power are expected to rise and therefore prematurely switch to the energy storage system to prevent excess costs for the customer in supplying power to the customer load. It is understood that the system will continuously update and train the neural network to improve the predictive analytics of the artificial intelligence and machine learning system.

The prior art fails to comprehensively detect and address the complexities of power quality issues, including harmonics and other primary power supply parameters, especially when they originate from upstream sources and or downstream sources. The use of artificial intelligence to predict downstream effects on the system based on upstream power supply parameters is an improvement over the prior art. The disclosed system solves the problem of detecting power quality issues originating from downstream sources by including a plurality of converters and/or inverters configured to prevent the backflow transmission of energy upstream. This mitigates potential disruptions and ensuring stable power transmission. By harnessing the capabilities of artificial intelligence, system can analyze vast amounts of data to improve the overall efficiency of the system. The system can learn and understand patterns and correlations that may be challenging for human operators to detect manually and which may be challenging for current systems to avoid prior to experiencing electrical failures and power quality issues. By continuously processing real-time data from multiple points in the grid, the system can predict potential disturbances caused by harmonics or deviations in other primary power supply parameters and alert operators to emerging issues, allowing for proactive measures to be taken. By simulating and modeling complex electrical interactions, the system can reveal potential risks and vulnerabilities related to different power supply parameters. These simulations enable a deeper understanding of downstream electrical effects that could arise from various load conditions and system configurations. The system not only enhances grid stability and reliability but also contributes to improved energy efficiency. By optimizing load management and power distribution based on artificial intelligence-driven insights, energy wastage can be minimized, leading to more sustainable and cost-effective power delivery to achieve greater efficiency, reliability, and resilience, making way for a smarter and more adaptive electrical infrastructure.

In certain embodiments, the method includes step 320, switching between the primary power supply and the secondary power supply. The system may include a first switch gate A connected between the primary power supply and the converter. The first switch gate A may be controlled by a control signal to selectively connect or disconnect the primary power supply to the converter. The control signal may be generated by a processor based on the monitoring of the primary power supply parameter. In an exemplary implementation, the first switch gate A may be a semiconductor device, such as a MOSFET or an IGBT, which allows for fast switching times and high efficiency. The use of the first switch gate A provides an additional level of control and protection to the system, allowing for selective disconnection of the primary power supply in the event of a primary power supply parameter threshold being exceeded or not being satisfied. This helps to prevent damage to the converter or other components in the system, and to ensure stable and reliable operation of the customer load.

The system may open switch gate A when the primary power supply parameter fails to satisfy the respective primary power supply parameter threshold. This could occur if the primary power supply voltage or frequency falls outside of the acceptable range, for example. Opening switch gate A disconnects the primary power supply from the converter, which prevents any potential voltage spikes or other issues with the primary power supply from being transmitted to the converter and ultimately to the customer load. This can help protect the customer load from damage and ensure that it continues to receive clean, stable power. Otherwise, in normal operation, switch gate A is generally closed.

The system may further include switch gate B electrically connected between the converter and the secondary power supply. Switch gate B is normally open such that the secondary power supply is electrically disconnected from the system, specifically, the converter. However, if there is a failure in the primary power supply, switch gate A would open, at step 320, to disconnect the primary power supply from the converter, and concurrently, at or about the same time, switch gate B would close to connect the secondary power supply to the converter. In operation, this allows the converter to direct the transmission of power from the secondary power supply to the at least one high discharge battery stack for charging the high discharge battery stack because the at least one high discharge battery stack is discharging to supply power to the customer load. This ensures uninterrupted power to the customer load even if there is a failure in the primary power supply. Once the primary power supply has been restored to normal operation, switch gate A would close again, and switch gate B would open to disconnect the secondary power supply from the converter, and the system would resume normal operation.

The converter plays a crucial role in safeguarding the electrical grid from potential back power, ensuring the stability and reliability of the entire system. By functioning as a protective barrier, the converter prevents any reverse flow of electricity from distributed energy sources, such as renewable energy systems or distributed generators, back into the grid. This is particularly important during moments of fluctuating demand and varying generation outputs. The converter effectively manages the direction of power flow, channeling energy from the grid to the distributed sources when needed while restricting any unauthorized reverse flow. By controlling this bidirectional energy exchange, the converter acts as an indispensable guardian, preventing disruptions, overloads, and potential damages to the grid, ensuring a seamless and secure integration of decentralized energy resources.

The secondary power supply is an electrical backup power source that is electrically connected to the system for providing power to the customer load in the event of a failure or inadequacy of the primary power supply. The secondary power supply can be any suitable backup power source, such as a battery bank, a generator, a fuel cell, or any other power source that is capable of providing power to the customer load. Examples of secondary power supplies include, but are not limited to, batteries, fuel cells, solar panels, wind turbines, generators, and other sources of electrical power that can be electrically connected to the converter.

The secondary power supply may be connected to the system via a switch gate that can be closed to electrically connect the secondary power supply to the converter. The secondary power supply can be continuously monitored to ensure its readiness to supply power when needed. Generally, the secondary power supply is an alternative, off-gird, power or energy source. In the context of the present disclosure, when the power supplied from the secondary power supply is engaged by the system, the system is configured to use said power to charge a high discharge battery stack. The high discharge battery stack, further discussed below, provides the necessary energy to support the customer load when the primary power supply is unavailable, unreliable, or not suitable to meet the needs and demands of the customer load or satisfy at least one inverter power parameter.

Next, the power from at least one of the primary power supply and the secondary power supply is transmitted across the first inverter and received by the converter at step 315. The system includes a converter for converting a first input received from at least one of the primary power supply and the secondary power supply to a first output. The converter is electrically connected to an inverter for converting a second input from at least one of the converter and at least one high discharge battery stack to a second output. The inverter is further electrically connected to the customer load for supplying power to the customer load.

In the context of the described method and system, the first input is generally an electric power signal received by the converter from at least one of two sources: the primary power supply or the secondary power supply. The first input may include various power supply parameters such as voltage, current, frequency, and phase angle, among others, depending on the type and characteristics of the power supply. The first input may be in the form of alternating current (AC) or direct current (DC) depending on the type of power supply and the design of the system. In general, the first input serves as the initial power source for the converter to condition and maintain the power transmitted to the customer load. Specifically, in one embodiment, the first input is a parameter of a signal received at the converter in the form of alternating current.

A converter is a device that is used to convert power from one form to another. In the context of the present invention, the converter is an electrical device that is used to convert the input power from at least one of a primary power supply and a secondary power supply to a form that is suitable for use by the customer load. The converter may be a power electronic device that includes one or more power switches, such as insulated gate bipolar transistors (IGBTs) or metal-oxide-semiconductor field-effect transistors (MOSFETs), that can be switched on and off at high frequencies. This allows the converter to control the output voltage, frequency, and waveform of the power that is supplied to the customer load. The converter may also include one or more control circuits that are used to adjust the converter power parameters, such as the voltage set point, frequency, and output power rating, in order to maintain a desired output voltage, frequency, and waveform. Additionally, the converter may include one or more sensing circuits that are used to measure the input and output power parameters, such as the input and output voltage, current, and power, in order to provide feedback to the control circuits for adjustment of the converter power parameters.

Next, at step 325, the first input is converted to a first output. The first input received by the converter, whether from the primary power supply or the secondary power supply, is converted into the first output by the converter. The conversion process involves the use of electrical components and circuitry to modify the input signal in a specific way, as determined by the system design. The exact nature of the conversion process depends on the specific type of converter used in the system, which can vary depending on factors such as the type of power supply, the power requirements of the customer load, and other design considerations. In general, however, the output generated by the converter is designed to be compatible with the customer load, providing a steady and reliable source of power that meets the at least one inverter power parameter through a process of regulation and filtering of the signals from at least one of the primary power supply and the secondary power supply. The output may be further conditioned or regulated by other components in the system, such as filters or voltage regulators, to ensure that it meets specific standards or requirements.

In operation, the system receives the first input from at least one of the primary power supply or the secondary power supply. The first input may be in the form of voltage, current, frequency, or any other suitable electrical parameter consistent with the embodiments of the present disclosure. The system then converts the first input into the first output, which may also be in the form of voltage, current, frequency, or any other suitable electrical parameter. The conversion of the first input to the first output is accomplished through the use of the converter, which may include one or more power electronics devices such as a rectifier, inverter, DC-DC converter, AC-DC converter, or DC controllers.

For example, if the first input is received from the primary power supply at a voltage of 240 volts and a frequency of 60 Hz, the converter may convert this input to a first output with a voltage of 120 volts and a frequency of 50 Hz to match the requirements of the inverter power parameters, which may correspond to the power requirements of the customer load. In another example, if the first input is received from the secondary power supply at a voltage of forty-eight volts and a current of ten amps, the converter may convert this input to a first output with a voltage of twenty-four volts and a current of twenty amps to match the requirements of the customer load. The converter may also be configured to regulate the first output to ensure that it remains within predetermined voltage and current limits, which may be set based on the requirements of the customer load or other system components.

Additionally, in one embodiment, the system is configured to convert the first input, which is alternating current (AC), to the first output, which is direct current (DC). In this embodiment, the converter is designed to rectify the incoming AC voltage waveform and smooth it out to produce a constant DC voltage output. This conversion process may incorporate the use of a rectifier circuit, typically composed of diodes, which allow current to flow in only one direction. For example, because the at least one high discharge battery stack is connected between the converter and the inverter, the use of a diode prevents the system from charging the at least one high discharge battery stack in normal operation when the power is supplied from the primary power supply. The incoming AC voltage waveform is applied to the rectifier circuit, which only allows the positive or negative portion of the waveform to pass through, depending on the diode's orientation. The resulting waveform is a series of positive or negative pulses, which are then smoothed out using capacitors to produce a stable DC voltage output. The DC voltage output is then supplied to the inverter as a second input, and then to the customer load as the second output.

Next, at step 330, the method includes determining whether the first output satisfies at least one inverter power parameter. The at least one inverter power parameter is any measurable aspect or characteristic of the AC power output by the inverter(s) of the system. This may include, but is not limited to, parameters such as frequency, voltage, current, power factor, total harmonic distortion (THD), and other electrical characteristics of the AC power output. These parameters may be measured by sensors or other monitoring devices connected to the system and may be used by the system to ensure that the AC power output is within acceptable ranges and free from any abnormalities or issues that could negatively impact the connected load.

In one embodiment, the at least one inverter power parameter refers to a measurable quantity that indicates the demand of the customer load. This measurable quantity can be any parameter that is indicative of the load on the inverter, such as the current or voltage output of the inverter. The at least one inverter power parameter can be measured using any suitable sensing device or technique, such as a current or voltage sensor. By monitoring the at least one inverter power parameter, the system can adjust the operation of the inverter and other components to ensure that the customer load is receiving the appropriate amount of power. In some embodiments, the at least one inverter power parameter may be used to determine when to activate or deactivate certain components of the system, such as the high discharge battery stack, in order to maintain a consistent power supply to the customer load. The at least one inverter power parameter includes at least one of (i) a voltage set point, (ii) a frequency, (iii) an input voltage, (iv) an output voltage range, (v) an output power rating, (vi) an efficiency, (vii) a waveform, (viii) a surge capability, (ix) a total harmonic distortion, (x) an overload protection, and (xi) a cooling method.

In one embodiment, the at least one inverter power parameter may refer to the output range voltage for the second output. The output range voltage may be a measurable quantity that corresponds to the demand of the customer load and may be determined based on the requirements of the load and other factors. The output range voltage may be expressed as a range of values and may be adjusted in real-time to ensure that the load receives a stable and consistent supply of power. Other embodiments of the at least one inverter power parameter may include other measurable quantities that relate to the performance or operation of the inverter, such as output frequency, efficiency, or power factor. It should be understood that the specific embodiments of the at least one inverter power parameter disclosed herein are provided for example purposes only, and that other embodiments may exist that incorporate substantially the same method steps and concepts disclosed herein.

As used and described herein, the parameters for the converter and the inverter may include at least one of (i) a voltage set point, (ii) a frequency, (iii) an input voltage, (iv) an output voltage range, (v) an output power rating, (vi) an efficiency, (vii) a waveform, (viii) a surge capability, (ix) a total harmonic distortion, (x) an overload protection, and (xi) a cooling method. The voltage set point is the desired output voltage level of the converter/inverter. The frequency is the rate at which the voltage oscillates between positive and negative values, measured in Hertz (Hz). The input voltage is the voltage level of the primary power supply that is provided to the converter and/or the voltage level of at least one of the primary power supply and the high discharge battery stack that is provided to the inverter. The output voltage range is the range of voltages that the converter can provide to the second inverter, and which the inverter can provide to the load, respectively. The output power rating is the maximum power that the converter can provide to the inverter, and the maximum power that the inverter can provide to the load, respectively. The efficiency is the ratio of the output power to the input power, expressed as a percentage. The waveform refers to the shape of the output voltage waveform, which can be sinusoidal, square, or another shape. The surge capability is the ability of the converter/inverter to handle a sudden increase in load demand. The total harmonic distortion is a measure of the distortion in the output waveform caused by the converter and/or the inverter, respectively. Overload protection is a mechanism that protects the converter and/or inverter from damage in case of an overload. The cooling method refers to the way in which the converter and/or inverter is cooled to prevent overheating. This can include air cooling, liquid cooling, or other methods depending on the converter design and operating environment. These parameters can be adjusted in various combinations to optimize the operation of the converter for a particular application.

If the first output transmitted from the converter satisfies the at least one inverter power parameter, then not charging and not discharging at least one high discharge battery stack at step 340. This ensures that the high discharge battery stack is not unnecessarily charged or discharged, which can prolong the lifespan of the batteries and improve the overall efficiency of the system. By monitoring and controlling the charging and discharging of the high discharge battery stack in this manner, the disclosed system and method can provide reliable and high-quality power to the customer load while minimizing the use of the battery system for critical states of the system and for when the primary power supply is unable to support the customer load or is deemed unreliable.

In certain embodiments, the method may include balancing, cycling, and recalibrating the at least one high discharge battery. Battery cycling plays a pivotal role in enhancing overall system performance, particularly concerning balancing and recalibration, which ultimately leads to improved battery life and cost-efficiency. Through systematic and controlled charging and discharging cycles, the disclosed system optimizes the usage of the high discharge battery stack. By ensuring that the batteries are not unnecessarily charged or discharged when the first output from the converter already meets the inverter power parameter at step 340, the system effectively minimizes stress on the batteries, prolonging their lifespan. This intelligent approach to battery management not only improves the overall efficiency of the system but also ensures that the batteries remain in their optimal operating condition for longer durations. By reducing unnecessary battery usage during critical system states and when the primary power supply is deemed unreliable, the disclosed system and method further reduce operational costs and maintenance requirements. Through strategic battery cycling, the system achieves a fine balance between power supply and demand, delivering reliable and high-quality power to the customer load while optimizing the battery system's performance and mitigating its associated costs. To ensure that the high discharge battery stack is not charged or discharged by the primary power supply, the system may include a power conversion system which can include various components and features to regulate the flow of power to the battery. In one embodiment, the primary power supply cannot charge the at least one high discharge battery stack because the converter may include various components that regulate the flow of power to the battery. For example, the converter may include a DC-DC component or port that is designed to connect to the battery in order to regulate the flow of power to the battery. Alternatively, the converter may include an additional DC-DC converter between the converter and the battery to help regulate the flow of power. One such component, such as a bi-directional DC-DC converter, such as converter 215, which can be used to control the voltage and power flow between the battery and the power conversion system. The converter can be designed to allow power to flow in both directions and can be configured to ensure that the battery is only charged or discharged when necessary to maintain the desired voltage set point.

In another embodiment, another manner to regulate the charging and discharging of the battery is such that the system includes a battery management system (BMS). The BMS can monitor the charging and discharging of the battery and can be configured to prevent overcharging or over-discharging. The BMS can work in conjunction with the power conversion system to ensure that the battery is charged only when needed, and to prevent the battery from being charged or discharged by the primary power supply.

A relay or switch can also be used to control the connection between the battery and the power conversion system. The relay or switch can be designed to open or close the circuit based on the voltage or power levels in the system and can be configured to prevent the battery from charging when it is not needed. Additionally, a voltage regulator can be used to maintain a specific voltage set point and prevent the battery from charging when the set point is already being met. In another embodiment, the converter may include a diode or a switch/relay in the circuit between the port and the battery, which can be controlled based on the power source being used. This allows the system to prevent power from flowing back to the primary power supply and only allows power to flow to the battery when it is necessary or safe to do so, such as when power is transmitted from the secondary power supply. In yet another embodiment, the battery charging may be controlled based on various battery charge control techniques such as constant voltage, constant current, or pulse charging.

To ensure that the battery is charged only when power is coming from the secondary power supply, a switch or relay can be included in the circuit between the port and the battery. The switch or relay can be controlled based on the power source being used, such that the circuit is closed only when the secondary power supply is active. Alternatively, a control system can be used to detect when the secondary power supply is active and adjust the charging and discharging of the battery accordingly. By implementing these features, the power conversion system can maintain the desired power parameter of the load while preventing the primary power supply from charging or discharging the high discharge battery stack.

In order to maintain the desired state of not discharging and not charging the batteries at step 340, the system, at step 335, continuously adjusts at least one converter power parameter to satisfy the at least one inverter power parameter. This may involve monitoring the at least one inverter power parameter and comparing it to a predetermined threshold and adjusting the converter power parameter accordingly. The adjustment may be made in real-time, and may involve changing the frequency, voltage, or other characteristics of the first output from the converter. The system may use various techniques to optimize the adjustment of the converter power parameter, such as feedback control loops, predictive algorithms, and machine learning models. By continuously adjusting the converter power parameter, the system can ensure that the second output provided to the customer load is within the desired range, while also avoiding unnecessary charging and discharging of the high discharge battery stack, which can help to prolong its lifespan and improve its reliability.

The parameters of the converter may be adjusted using a control system, which may include at least one processor and memory storing instructions for adjusting the parameters. The control system may receive input from sensors monitoring the primary and secondary power supplies, as well as the high discharge battery stack and the customer load. Based on this input, the control system may adjust one or more parameters of the converter, such as the voltage set point, frequency, input and output voltages, power rating, efficiency, waveform, surge capability, total harmonic distortion, overload protection, and cooling method. The adjustment may be made continuously, periodically, or based on specific events or conditions.

In one embodiment, the system adjusts the set point of the converter to maintain the ideal state of not discharging and not charging the batteries. The set point refers to a specific target value for a given parameter that the converter is trying to maintain. By adjusting the set point, the system can control the output of the converter and ensure that it is within the desired range for the at least one inverter power parameter. The adjustment of the set point may be performed automatically by the system based on real-time data received from sensors or other sources. In another embodiment, the set point may be manually adjusted by an operator or user of the system. The ability to adjust the set point allows the system to respond to changes in the demand of the customer load and maintain the proper balance between the primary power supply, the high discharge battery stack, and the secondary power supply.

In another embodiment, the set point of the converter is a DC voltage set point. The DC voltage set point may be adjusted based on the measured output voltage of the converter, which is compared to the at least one inverter power parameter. The comparison may be made using a processor that continuously monitors the output voltage of the converter and adjusts the DC voltage set point as needed to maintain the at least one inverter power parameter. By adjusting the set point of the converter in real-time, the system can ensure that the converter is providing power to the customer load at the appropriate voltage level, while also avoiding the need to charge or discharge the high discharge battery stack unnecessarily. This can help to prolong the life of the batteries and reduce the overall maintenance requirements of the system.

Continuously adjusting the DC voltage set point, in one embodiment, every 25 to 75 milliseconds, is critical for maintaining the stability and reliability of the system. "Continuously adjusting" means that the converter power parameter is constantly monitored and modified to ensure that it is aligned with the desired inverter power parameter. This adjustment is made in real time, and the system may use various feedback mechanisms, such as sensors or data analytics, to continually monitor and adjust the converter power parameter to maintain the desired output to the customer load. The adjustment may be made automatically by the system's control logic or may be controlled manually by an operator or remote processor connected to the system. Continuously adjusting at least one converter power parameter to satisfy at least one inverter power parameter, may include adjusting parameters of the converter, including at least one of (i) a voltage set point, (ii) a frequency, (iii) an input voltage, (iv) an output voltage range, (v) an output power rating; and wherein the at least one inverter power parameter is an output voltage range, to alter the first output such that it satisfies the inverter power parameter.

The high discharge battery stack has the capability of quickly discharging, and the customer load may have varying power demands. By adjusting the DC voltage set point in such a brief time frame, the system can ensure that the customer load is receiving the necessary power without relying on the high discharge battery stack. Additionally, it allows the system to quickly respond to any fluctuations or disturbances in the primary power supply, ensuring that the load is not affected. This rapid adjustment capability also enables the system to optimize the charging and discharging of the high discharge battery stack, prolonging its lifespan, and improving its overall performance. Therefore, adjusting the DC voltage set point every 25 to 75 milliseconds is a critical aspect of the invention, contributing to its reliability, stability, and efficiency.

As a result, of the ideal state, the at least one inverter power parameter is satisfied. Therefore, at step 345, the first output, being power derived from the primary power supply, is transmitted to the inverter, thereby defining a second input. Alternatively, the below description describes the methods and systems should the first output fail to satisfy the at least one inverter power parameter.

For example, if the first output transmitted from the converter fails to satisfy the at least one inverter power parameter, then discharging, at step 355, the at least one high discharge battery stack. The converter power parameter is continuously adjusted to ensure that the high discharge battery stack is only discharged if the primary power supply parameter fails to satisfy a primary power supply parameter threshold. A chain reaction event of the primary power supply parameter failing to satisfy the at least one primary power supply parameter threshold is that the first output, at the converter, will ultimately fail to satisfy the at least one inverter parameter. Consistent with this disclosure, this means for example, that the first output at the converter is not within the desired output range of the inverter needed to satisfy the demands of the customer load.

Thus, when the first output fails to satisfy the at least one inverter power parameter, the system discharges the at least one high discharge battery stack to restore power to the customer load near instantaneously. In certain embodiments, the system may need to discharge the high discharge battery to make up for any difference between the first output from the converter and the desired range of output to the customer load, as indicated by the inverter power parameter. This discharge of the high discharge battery can help maintain the desired output to the customer load, even if the primary power supply is not meeting the required power parameter threshold. This discharge can be performed by the converter, which can be continuously adjusted to maintain the desired output to the customer load while also ensuring that the high discharge battery is not over-discharged, which could lead to damage or reduced battery life.

In one example, the inverter power parameter is set to maintain an output range of 220-240V for the customer load, but the first output from the converter is only 215V. In this case, the system may determine that there is a deficit of 5V to meet the inverter power parameter. If the primary power supply parameter fails to satisfy the primary power supply parameter threshold and the high discharge battery is available, the system may discharge the battery to recover the 5V needed to meet the inverter power parameter. This ensures that the customer load receives the desired output range while also utilizing the high discharge battery efficiently.

In other embodiments, if there is an excess second input at the inverter from the primary power supply, the system may bias or adjust a converter power parameter to charge the battery stack. For example, the voltage set point of the converter may be adjusted to allow for charging of the battery stack. The system may continuously monitor the voltage and current levels of the battery stack to determine if charging is needed and adjust the converter power parameter accordingly. If the battery stack is fully charged or if the primary power supply parameter satisfies the respective primary power supply parameter threshold, the system may bias or adjust the converter power parameter to prevent overcharging of the battery stack. This ensures that the battery stack is charged only when necessary and prevents overcharging and damage to the battery stack.

In certain embodiments, discharging the at least one high discharge battery stack may include switching to the secondary power supply at step 360 in a manner consistent with this disclosure and adjusting the at least one converter power parameter at step 365 to allow the secondary power supply to charge the at least one high discharge battery stack at step 370. In one embodiment of the system, the at least one high discharge battery stack is charged exclusively by the secondary power supply. This step may be achieved by opening a switch, such as switch gate A, to disconnect the primary power supply from the converter, and closing switch gate B to electrically connect the secondary power supply. Once the primary power supply is disconnected, the system can rely on the secondary power supply to provide the necessary power to charge the battery stack. The switch can be opened and closed automatically by the control system, based on the power source being used and the state of the battery stack. This embodiment ensures that the battery stack is charged only by the secondary power supply, which is typically a more stable and reliable power source than the primary power supply.

In certain embodiments, the disclosed system may incorporate a plurality of converters and/or inverters. At step 360, the process of discharging the at least one high discharge battery stack may involve switching to the secondary power supply in accordance with this concept and further adjusting the relevant converter power parameters at step 365 to enable the secondary power supply to charge the battery stack at step 370. Notably, the system's design allows for the potential utilization of multiple converters and/or inverters to manage power transmission and conditioning efficiently.

The at least one high discharge battery stack electrically connected between the converter and the inverter. In an ideal normal state, the primary power supply cannot charge the at least one high discharge battery stack. The high discharge battery stack refers to a battery system with the capability to discharge at high rates of power for short periods of time, typically used for power storage and supply in energy systems. The high discharge battery stack may consist of multiple cells arranged in series and/or parallel configurations to provide the desired voltage and capacity. In one embodiment, the high discharge battery stack may be comprised of lithium-ion cells, or any other battery technology capable of high-power output. The high discharge battery stack may also include a battery management system to monitor and regulate the battery's charge and discharge, as well as to prevent overcharging or over-discharging.

In particular, the high discharge battery stack is rated at least 2 C, meaning that it is capable of discharging at a rate equal to twice its capacity in ampere-hours (Ah) within one hour. In a preferred embodiment, the high discharge battery stack is rated at least 3 C, allowing it to discharge at a rate equal to three times its capacity in Ah within one hour. In a further embodiment, the high discharge battery stack is rated at least 5 C, meaning it can discharge at a rate equal to five times its capacity in Ah within one hour. The high discharge battery stack is critical to the present invention as it serves as a backup power source in case the primary or secondary power supply fails to provide the required power output. The higher the C rating of the high discharge battery stack, the faster it can provide power to the system, ensuring that the customer load is not affected by any power interruptions. Additionally, a higher C rating allows for a smaller and more compact battery system, which is advantageous in space-limited applications.

The use of a high discharge battery stack with at least 2 C, and preferably at least 3 C or at least 5 C rating in the present invention improves over the prior art by allowing for efficient and effective conditioning and maintenance of power transmitted to a customer load from at least one of a primary power supply and a secondary power supply. The high discharge battery stack with a high C rating is able to quickly discharge power to the inverter when needed, improving the system's ability to maintain stable power to the customer load. Additionally, the high discharge rate allows the battery stack to quickly charge when excess power is available, which helps to ensure that the battery is fully charged and ready to discharge power as needed. The use of a high C rated battery stack also improves the overall efficiency of the system, as it allows for more power to be transmitted between the converter and the inverter in a shorter amount of time, reducing the amount of energy lost as heat during transmission. This can result in cost savings and a reduced carbon footprint for the system. Overall, the high discharge battery stack with a high C rating is a critical component in the present invention, as it allows for efficient and effective conditioning and maintenance of power, resulting in a more reliable and cost-effective system for transmitting power to a customer load.

Due to the high discharge rate of the battery, the system is configured to charge the battery quickly to ensure that the customer load does not lose power. This is accomplished by adjusting the converter power parameter such that power is transmitted from the secondary power supply to the converter to the at least one high discharge battery stack for charging the battery. When the battery is charged, power is discharged from the battery stack to the inverter and then transmitted to the customer load. The system continuously adjusts the converter power parameter to ensure that the battery is charged and discharged in a manner that meets the inverter power parameter and ensures uninterrupted power to the customer load.

The high discharge battery stack is an essential component of the power conversion system, providing a reliable, efficient, and a rapid source of energy to the customer load. In one embodiment, the high discharge battery stack is designed to have a nominal voltage of at least 860 V, which allows it to deliver high power output when needed. In another embodiment, the high discharge battery stack is made up of a plurality of independent batteries that are connected in either series or parallel, depending on the desired voltage and current requirements.

Other embodiments of the high discharge battery stack may include different C ratings, such as at least 3 C or at least 5 C, to meet specific power demands of the load. The high discharge battery stack can also include other features, such as thermal management systems, safety mechanisms, and state-of-charge monitoring systems to ensure the safe and efficient operation of the battery. Additionally, the high discharge battery stack can be made from a variety of different chemistries, including but not limited to lithium-ion, nickel-cadmium, and lead-acid. The choice of battery chemistry can depend on numerous factors, such as cost, energy density, and safety requirements.

At step 375, the power from the at least one high discharge battery is transmitted to the inverter, defining the second input of the inverter.

In step 350, the inverter receives power defined as a second input where the power is derived from at least one of (i) the primary power supply, and (ii) the at least one high discharge battery. It is understood that the source of the second input may be defined based on the different embodiments of the method and system as disclosed herein. It is further understood that this step may not be numbered or described sequentially for purposes of describing different paths of the flow chart and method 300.

Next, at step 380, the system includes an inverter that converts the second input, which may be DC power from the high discharge battery stack and/or the primary power supply via the converter, into an AC voltage waveform that matches the characteristics of the customer load. The inverter may be a bi-directional DC-AC converter that can switch between converting DC power to AC power and vice versa. The inverter may include one or more power switches, such as MOSFETs or IGBTs, that are controlled by a microprocessor or other control circuitry to switch the DC voltage on and off at a high frequency, typically in the kilohertz range. The resulting AC waveform may be sinusoidal, square wave, or some other waveform that matches the requirements of the customer load. The inverter may also include filtering and conditioning components, such as capacitors and inductors, to smooth the AC waveform and reduce harmonics and other distortions.

Next at step 385, the cleaned and reliant power is transmitted to the customer load. It is understood that the customer load in the present disclosure is any device or system that requires electrical power to operate. The customer load may include, but is not limited to, electronic devices, appliances, machinery, or any other equipment that requires electrical power. The customer load may have varying power requirements and may require a continuous or intermittent supply of power. The customer load may be connected to the system via any suitable means, such as a wired or wireless connection. In some embodiments, the customer load may be connected directly to the converter, while in other embodiments, the customer load may be connected to the system via an intermediate device or circuit. The customer load may be located at a remote location from the system or may be co-located with the system. The customer load may be controlled by the user or may operate automatically based on predetermined parameters or instructions. The customer load may be monitored and controlled by the system to ensure proper operation and to prevent damage to the load or the system.

The system may further include a graphical display for displaying a real-time monitoring of the at least one power supply parameter and at least one minimum or maximum threshold level for the power supply parameter. The system continuously adjusts at least one converter power parameter to satisfy at least one inverter power parameter, and continuously adjusts the voltage set point between every 25 to 75 milliseconds.

In operation, if the at least one primary power supply parameter fails to satisfy a respective primary power supply parameter threshold, the system receives the first input from the secondary power supply instead of the primary power supply. If the first output transmitted from the converter satisfies the at least one inverter power parameter, the system does not charge or discharge the at least one high discharge battery stack. If the first output transmitted from the converter fails to satisfy the at least one inverter power parameter, the system discharges the at least one high discharge battery stack.

The system is capable of supplying power to the customer load from either the primary power supply or the secondary power supply, depending on the condition of the primary power supply parameter. The system thus ensures that the customer load receives a stable supply of power, regardless of the condition of the primary power supply parameter, and the high discharge battery stack provides a backup power source in case of any power supply interruption.

Figure 4:
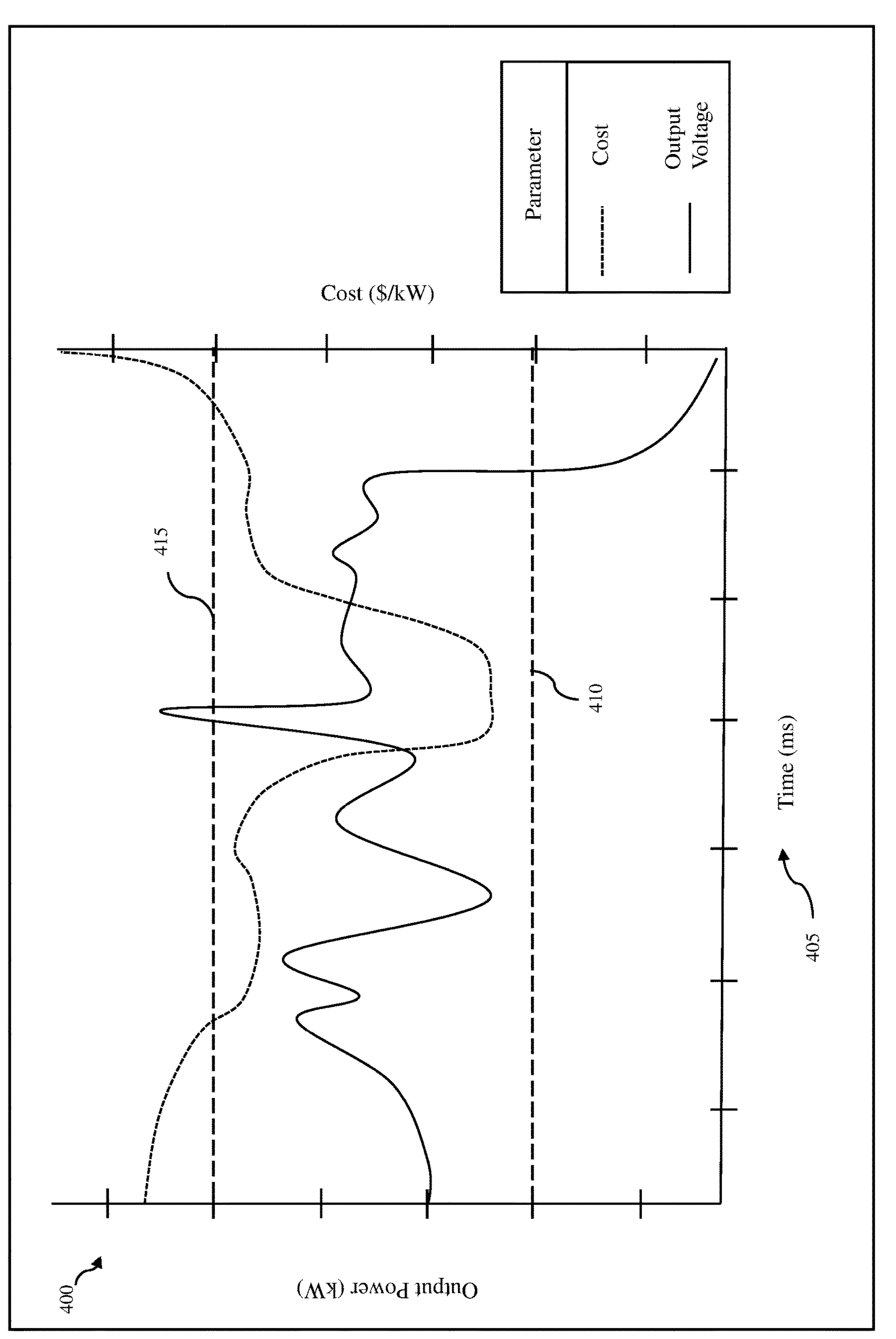
FIG. 4 is a graphical representation of monitoring, in real time, at least one primary power supply parameter to determine whether the at least one primary power supply parameter satisfies a respective primary power supply parameter threshold level, according to an example embodiment.

In certain embodiments, based on monitoring the various components of the system using at least one of a plurality of sensors, a connected database, a remote processor, and clod network systems, the method may include a generating, step 390, a graphical display (400 in FIG. 4) including (i) a real-time monitoring (405 in FIG. 4) of the at least one power supply parameter, and (ii) at least one of (1) a minimum threshold level 410 and a (2) maximum threshold level 415 for the at least one power supply parameter. Said graphical display 400 is shown in FIG. 4 as an example embodiment of the present disclosure. The real time monitoring of the at least one power supply parameter may be represented as a graph, for example, as a function of time. The graph includes the x-axis representing time, and the y-axis representing the power supply parameter being monitored, such as voltage or frequency. The intervals for real-time monitoring can vary depending on the system and the specific parameter being monitored. In general, real-time monitoring refers to a continuous or near-continuous monitoring process, where data is collected and analyzed at regular intervals that are short enough to provide an accurate and up-to-date picture of the system's performance. The intervals can range from milliseconds to seconds, depending on the system requirements and the level of detail needed for monitoring the specific parameter.

The real-time monitoring of the power supply parameter could be shown as a line graph that updates in real-time as the parameter changes. In addition to displaying the real-time monitoring of the power supply parameter and the threshold levels, the Y-axis of the graph could be labeled with cost. The cost could represent the monetary cost of operating the system or the environmental cost of the system's energy consumption. By displaying the power supply parameter and its threshold levels along with the associated cost, the user can easily monitor and optimize the system's performance to balance the cost with the desired power output. This allows the user to make informed decisions about the system's operation and optimize its efficiency and cost-effectiveness.

In certain embodiments, the Y-axis of the graph may represent the efficiency of the power conversion system, which is defined as the ratio of output power to input power. The efficiency may be affected by numerous factors, including the quality of the components used, the design of the system, and the operating conditions. By monitoring the efficiency of the power conversion system over time, the user can identify any issues that may be affecting the system's performance and take corrective action as needed. In other embodiments, the Y-axis may represent the voltage or current levels of the power supply, the frequency of the output waveform, the total harmonic distortion, the power factor, or other relevant parameters. The choice of Y-axis parameter may depend on the specific application and the goals of the monitoring system.

The minimum and maximum threshold levels for the power supply parameter could be shown as horizontal lines on the graph, indicating the range of acceptable values for the parameter. If the power supply parameter falls below or above the threshold levels, an alarm or warning could be triggered to alert the operator. Additionally, the graph may include different colors or markers to distinguish between the primary power supply and the secondary power supply parameters. This would allow the operator to quickly identify which power supply is causing the issue if there is a problem. Overall, the graph would provide a visual representation of the power supply parameters, allowing the operator to easily monitor and adjust the system as needed.

If the real-time monitoring indicates that a parameter exceeds a threshold level, the system may take appropriate corrective action. For example, if the primary power supply parameter exceeds a maximum threshold level, the system may automatically switch to the secondary power supply or the high discharge battery stack to prevent damage to the customer load. Similarly, if the at least one inverter power parameter exceeds a minimum or maximum threshold level, the system may adjust the converter power parameter to maintain the desired output range to the customer load and/or the system may engage the at least one high discharge battery stack to discharge power to the customer load. The graphical display may also provide alerts or warnings when the parameter exceeds a threshold level to prompt the user to take action. By monitoring and responding to the power supply parameters in real-time, the system can ensure reliable and efficient operation, while protecting the customer load from potential damage or disruption.

It is understood that the real-time monitoring refers to the continuous observation and recording of data as it occurs, with little or no delay between the time the data is collected and when it is displayed or analyzed. In the context of power supply systems, real-time monitoring typically involves the use of sensors, meters, or other monitoring devices to collect data on various parameters such as voltage, current, power, and temperature, and then display or transmit that data to a monitoring system or device in real-time. Real-time monitoring allows operators or users to quickly detect any changes or anomalies in the power supply system and take appropriate action to prevent or mitigate any potential issues.

As shown in FIG. 4, it is understood that at any period of time a parameter is above the maximum threshold 415 or below the minimum threshold 410 of the respective parameter, then the system may automatically switch from the primary power supply to the alternative power source, such as the at least one high discharge battery and the secondary power supply. In some embodiments, the graphical interface displaying the real-time monitoring of the power supply parameter, along with the minimum and maximum threshold levels, may be displayed on one or more displays connected to the system. The system may receive the real-time input from a plurality of sensors that are configured to monitor the power supply parameter. The sensor data can be analyzed and processed by the system to provide a real-time display of the power supply parameter on the graphical interface. Additionally, the system may receive data from a connected database or transmitted across a network, which can be used to further enhance the real-time monitoring and display of the power supply parameter. The data received from the network or database may include historical data, trends, and other related information, which can be used to provide a more comprehensive view of the power supply parameter and its performance over time.

Figure 5A:
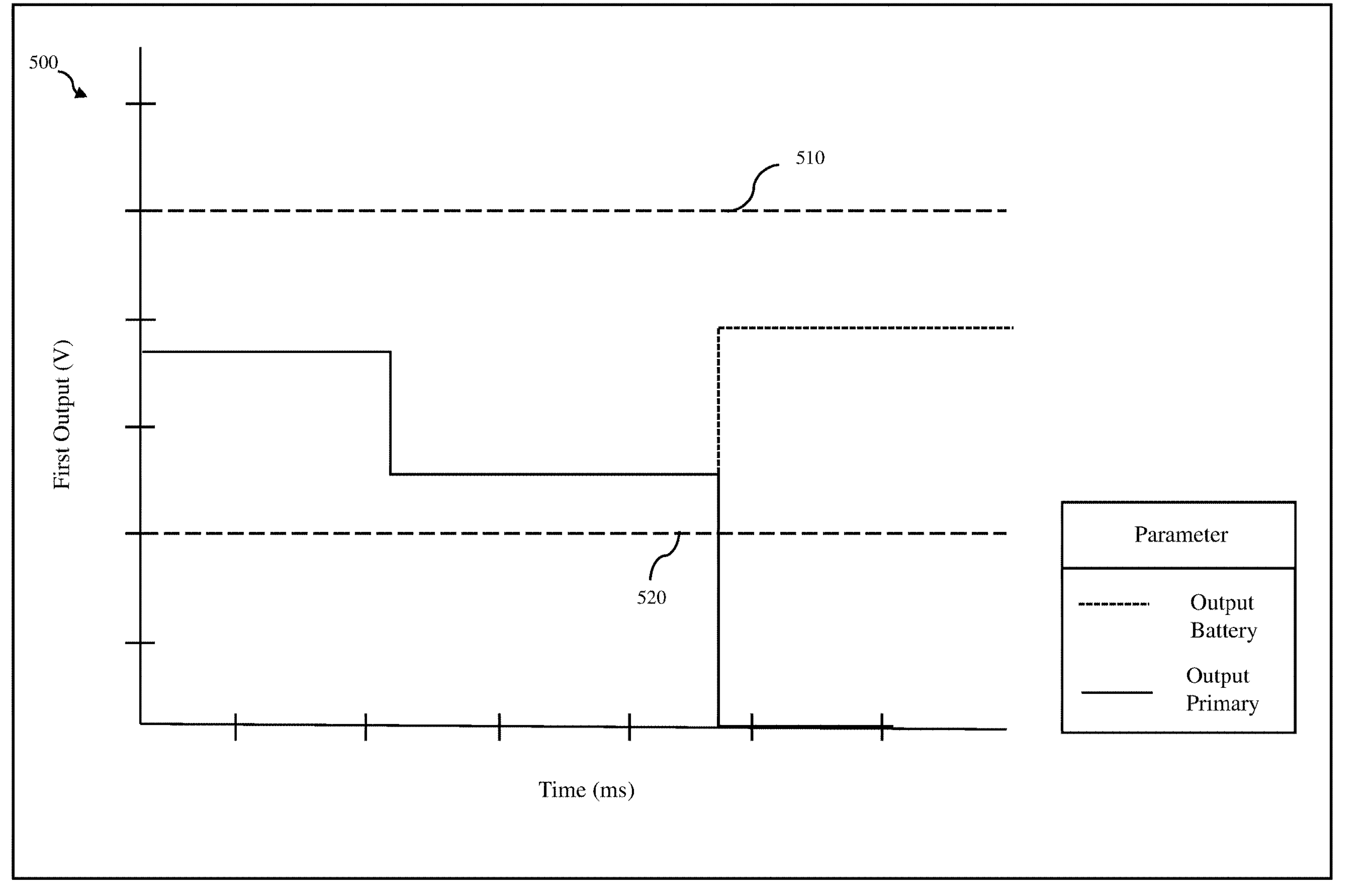
FIG. 5A is an exemplary embodiment of the first output being monitored to determine whether it satisfies at least one inverter power parameter, according to an example embodiment.

FIG. 5 is an exemplary embodiment of the first output being monitored to determine whether it satisfies at least one inverter power parameter. The graphical interface 500 may also include a real-time monitor of the first output compared to the inverter power parameter. For example, a graph may be generated as a function of time. In the example embodiment 500, the first output, being measured as voltage is charted over time. The inverter power parameter may be output voltage and may be indicated by an acceptable range having a minimum output voltage and a maximum output voltage. Such minimum and maximum output voltages may be shown as level thresholds on the chart, such as maximum threshold level 510 and minimum threshold level 520. The acceptable range to satisfy the inverter power parameter would be between the minimum and maximum threshold levels. For other parameters, it is understood that there may only be a minimum threshold and/or a maximum threshold. As shown in FIG. 5, when the output voltage crosses over the minimum threshold level, it no longer satisfies the at least one inverter power parameter. Thus, the method would immediately engage the battery to discharge the at least one high discharge battery stack as to satisfy the at least one inverter power parameter.

FIG. 5B through 5E illustrate the first input, first output, second input and second output according to an example embodiment. As stated above, the measurable inputs could be any parameter of the power being supplied to the system. Generally, the first input is AC power, and the first output is DC power. However, changing at least one converter power parameter may include changing certain signals from the input power to the input power, such as amplitude, frequency, waveform, etc. FIG. 5B illustrates the first input and FIG. 5C illustrates a first output, according to an example embodiment.

The first input to the system is typically an AC power supply from a primary power source as shown in FIG. 5B. This AC input is converted into a DC voltage by the converter, which may include a rectifier to transform the AC waveform into a DC waveform, as shown in FIG. 5C. In one embodiment, the DC voltage is then used to charge a capacitor, which acts as a filter to smooth out any variations in the output voltage. The capacitor voltage may then be used as the second input to the inverter, shown in FIG. 5D, which converts the DC voltage back into an AC waveform, shown in FIG. 5E, that is suitable for powering the customer load. Overall, the conversion of power through the converter and inverter helps to clean the power by smoothing out the input waveform and generating a more stable and consistent output waveform. The capacitors in the converter help to filter out noise and voltage spikes, while the inverter can be designed to produce a clean sinusoidal waveform with low harmonic distortion. This results in a more reliable and consistent power supply to the load, which can help to improve the performance and lifespan of connected equipment. Additionally, the use of isolation transformers can help to eliminate ground loops and reduce the risk of electrical noise and interference, further improving the quality of the power supply.

The output waveform from the inverter can be adjusted to match the specific requirements of the load, such as frequency, voltage, and power rating, by adjusting the converter power parameters. This process of converting the AC input to a DC voltage, smoothing it out with a capacitor, and then converting it back into an AC waveform is critical to ensuring that the customer load receives clean, stable power that meets its specific requirements.

It is understood that the embodiments of FIG. 5B through 5E are merely examples of the system and are not intended to limit the scope of the invention. In other embodiments, different parameters, such as frequency, waveform, and other electrical characteristics, may be adjusted to suit the requirements of the particular application. For example, the waveform of the output may be modified to achieve a particular power factor, or the frequency of the output may be adjusted to match the frequency of the customer load. It will be appreciated that various modifications and alterations may be made to the embodiments disclosed herein, and that such modifications and alterations are within the sprit and scope of the present invention.

Figure 6:
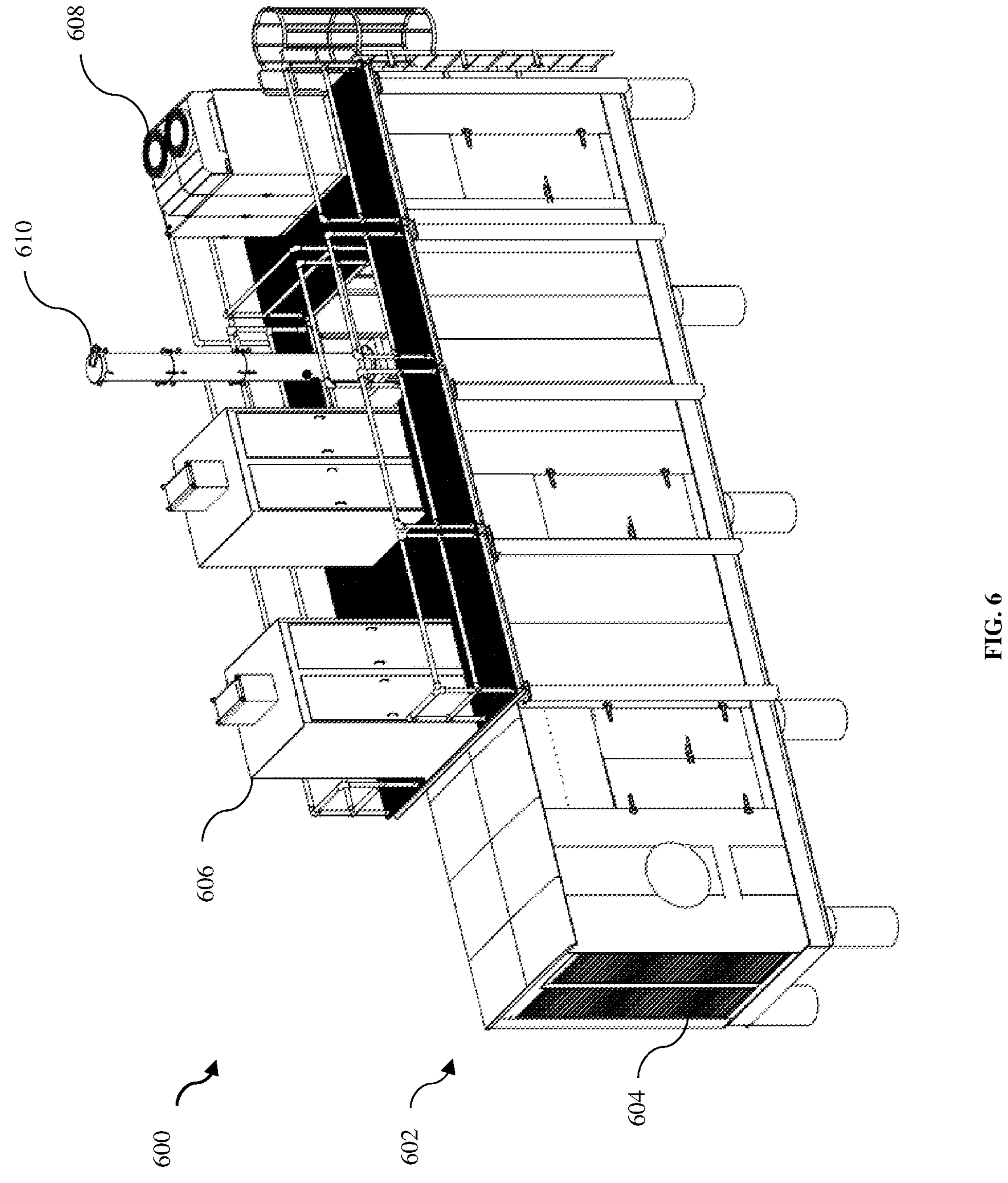
FIG. 6 is a perspective view of an enclosure for the system is shown, according to an example embodiment.

Referring now to FIG. 6, a perspective view of an enclosure 600 for the system is shown, according to an example embodiment. The enclosure houses the system which includes the secondary power supply 602 and the switching module. The secondary power supply 602 includes the secondary power supply source 604, which may be a generator set, for example. In one embodiment, the system includes at least one secondary power supply source. The dimensions and component configuration of the enclosure may depend on the size of the secondary power supply source such that, in one embodiment, at least one secondary power supply source having outputs at least five hundred kilowatts and may include modular generators at least five hundred kilowatts or greater than five hundred kilowatts. In another embodiments, there may be at least one secondary power supply source where the secondary power supply source includes at least one of a natural gas fuel powered generator, a gasoline fuel powered generator, a propane fuel powered generator, a diesel fuel powered generator, a solar fuel powered generator, and a second primary power source. Other embodiments having a plurality of secondary power supply sources may be included and are within the spirt and scope of this disclosure.

In one embodiment the secondary power supply may include a natural gas generator set where the natural gas generator set is at least one of a 650 kWe, 1000 kWe, and 1400 kWe generator set. The secondary power supply can generate an output of 480/600 VAC. In one embodiment, the secondary power supply may include a brushless exciter with optional permanent magnet generator where the power supply voltage is generated by a permanent magnet generator mounted within the secondary power supply. The permanent magnet generator delivers constant voltage to the AVR of the secondary power supply source where the voltage is independent of the main alternator winding of the secondary power supply source generating a voltage reference shunted on alternator output terminals. The AVR then delivers an excitation current suitable for the load of the system. Therefore, the system, having the permanent magnet generator, has a high overload capacity.

The secondary power supply source is configured to supply enough power to support the customer loads. The enclosure is configured to provide a modular and interchangeable means for providing rapid amounts of power. The enclosure may include a battery cabinet 606 configured to house a high discharge battery. The enclosure also houses at least one inverter 608 of the energy storage system. The battery cabinet may contain at least one high discharge battery such that the system may include a plurality of high discharge batteries. Additionally, a modular exhaust system 610 may be used and included in the enclosure.

The modular design of the enclosure includes the components of the system which are preassembled to reduce construction and installation times in the field. Particularly, in mission critical facilities and emergency situations, the system is designed to be installed and removed or broken down quickly to be moved to another site as needed.

Figure 7A:
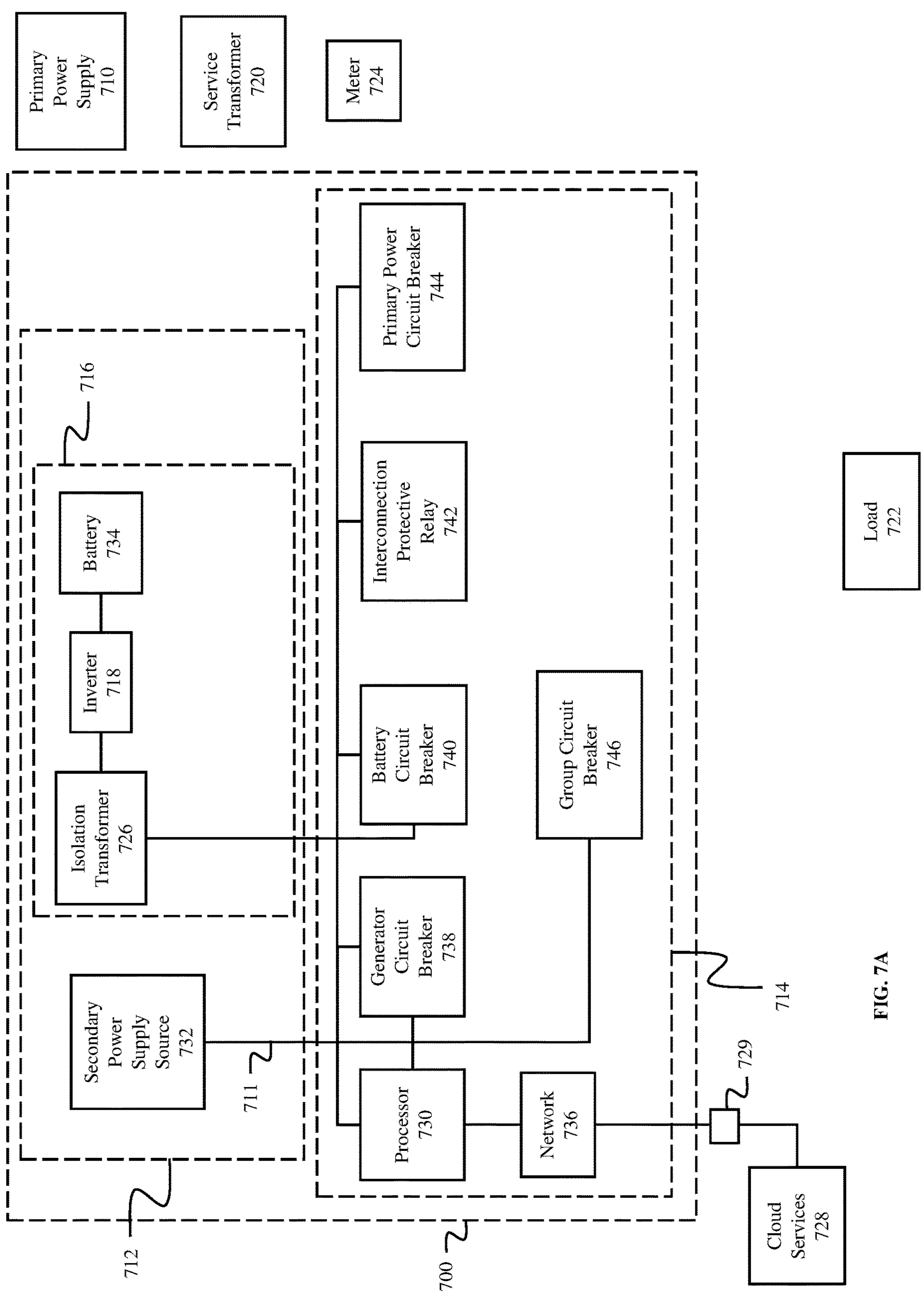
FIG. 7A is a block diagram illustrating the communication network of the main components of the system for providing a rapid threshold amount of power to a customer load during transfer between a primary power supply and a secondary power supply, according to a second example embodiment.
Figure 7B:
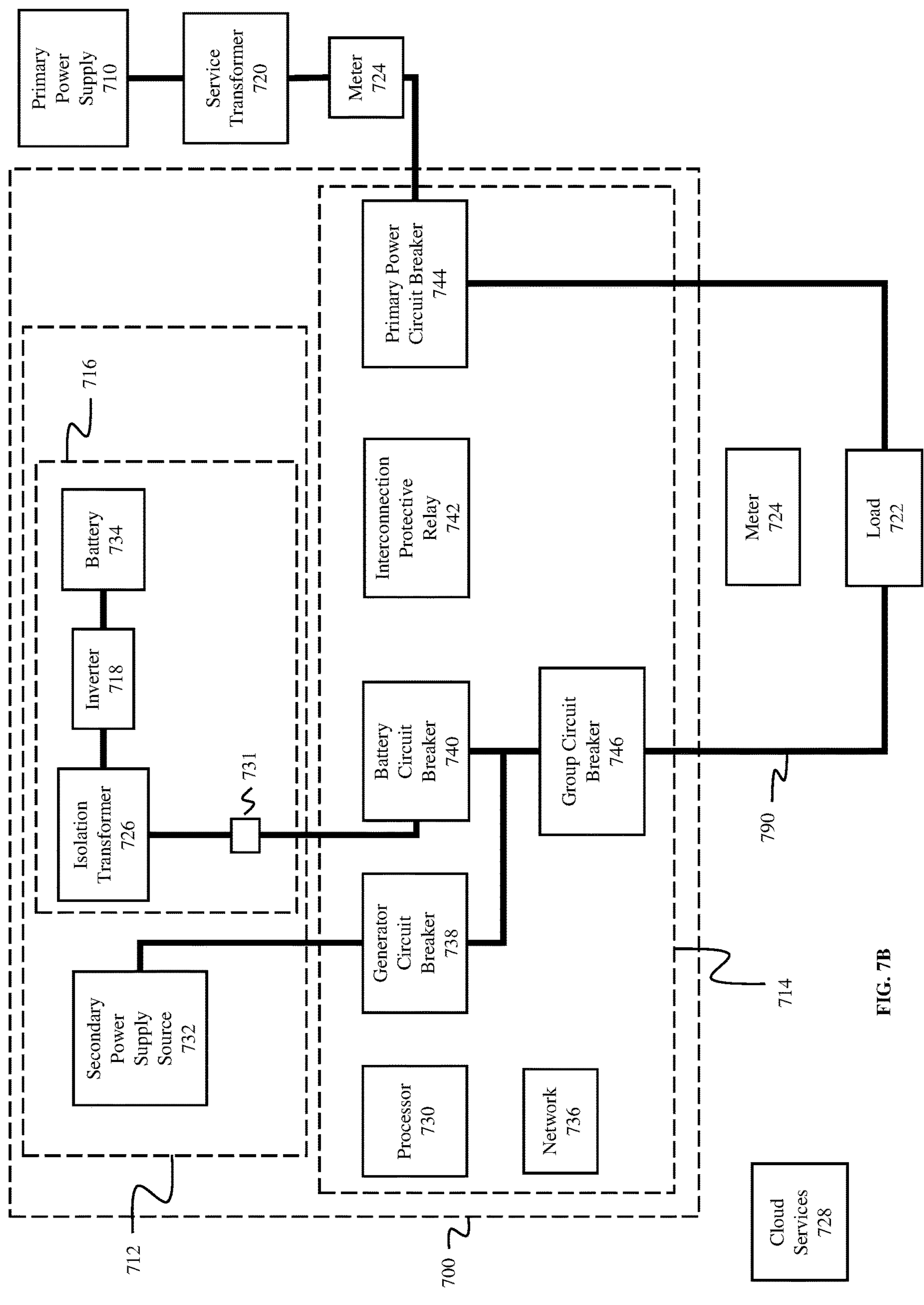
FIG. 7B is a block diagram illustrating power transmission of the main components of the system for providing a rapid threshold amount of power to a customer load during transfer between a primary power supply and a secondary power supply illustrating, according to the second example embodiment.
Figure 7C:
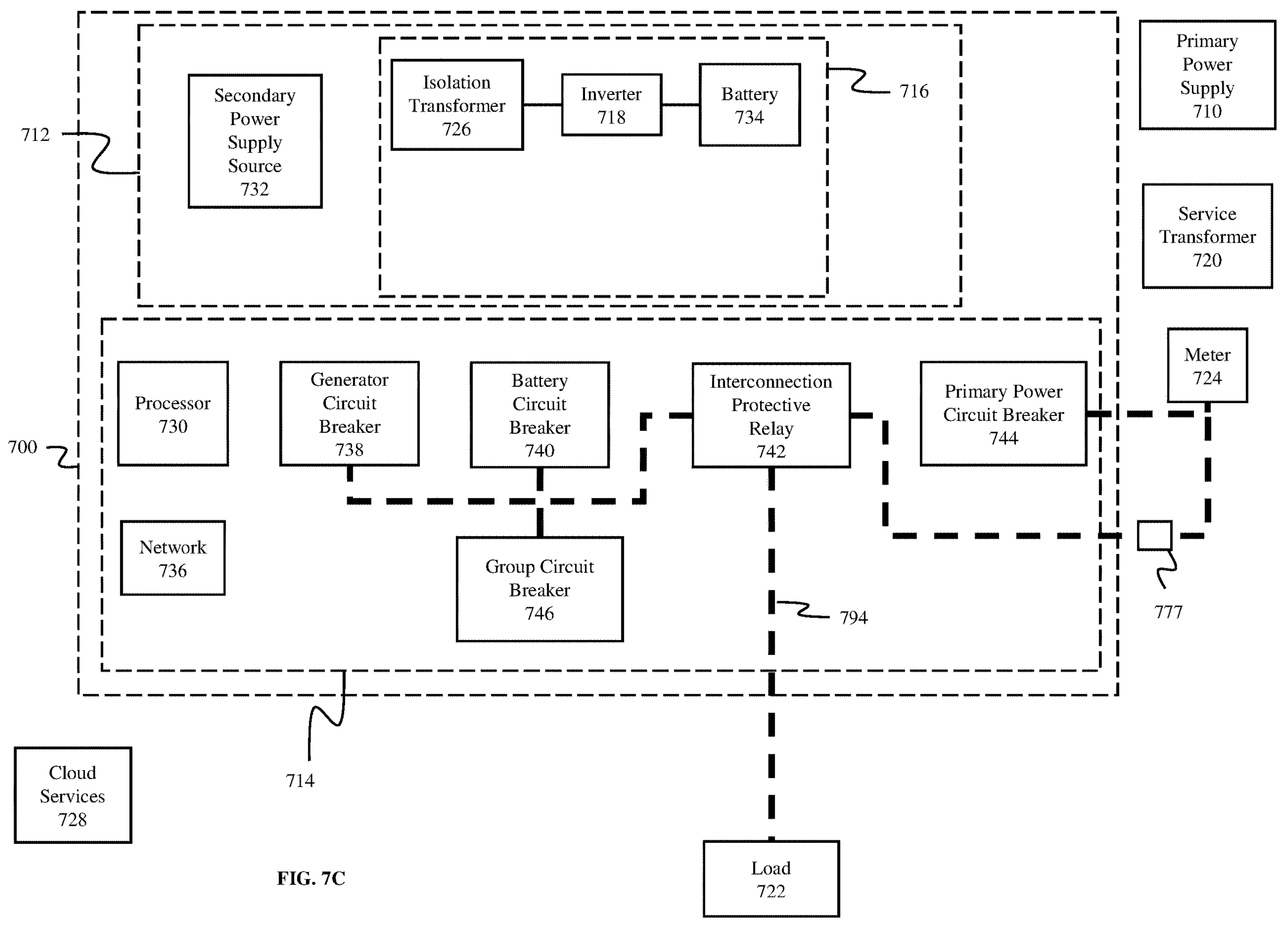
FIG. 7C is a block diagram illustrating the metering system of components of the system for providing a rapid threshold amount of power to a customer load during transfer between a primary power supply and a secondary power, according the second example embodiment.
Figure 7D:
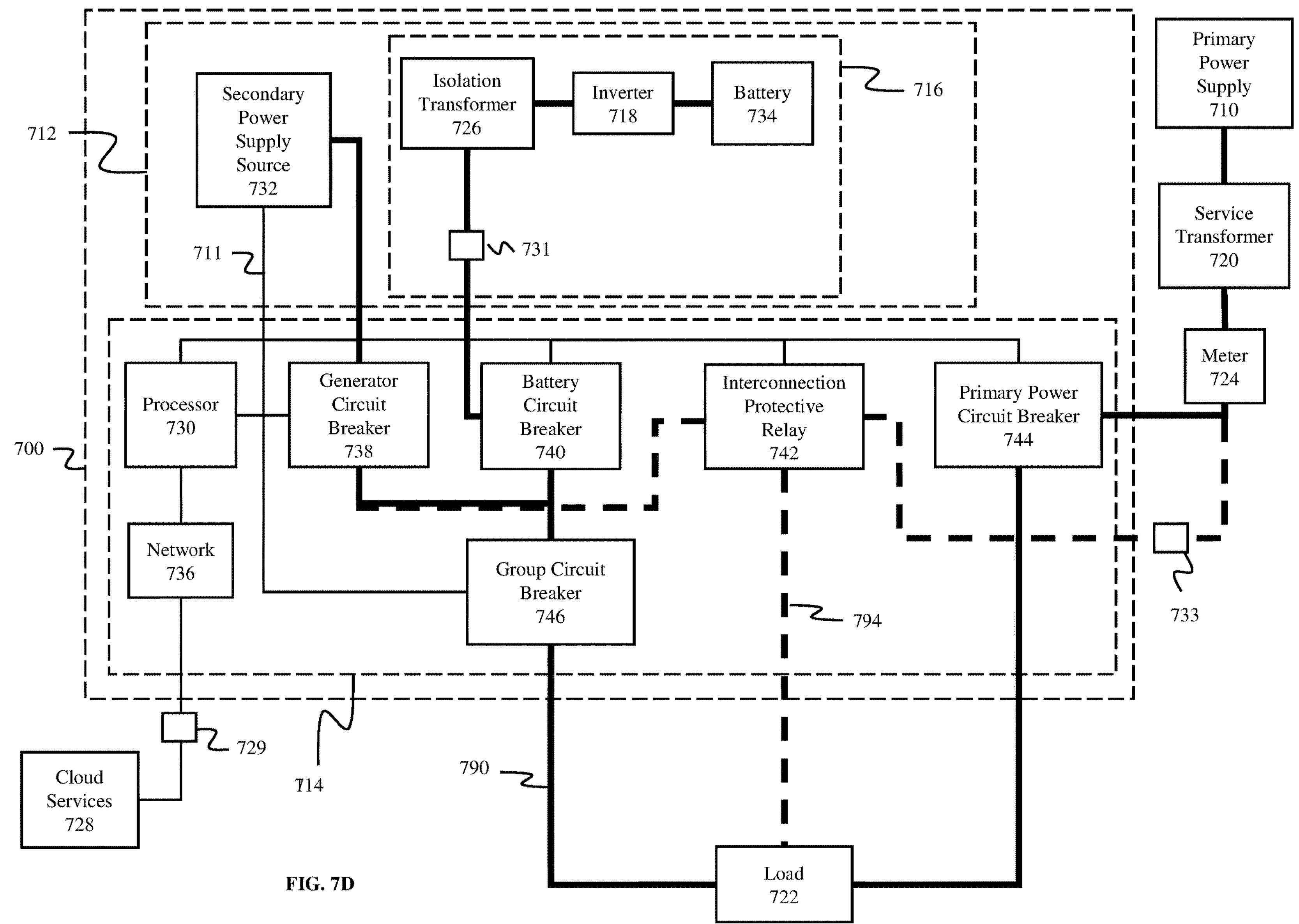
FIG. 7D is a block diagram of illustrating the communication, power, and metering of the system for providing a rapid threshold amount of power to a customer load during transfer between a primary power supply and a secondary power supply illustrating the metering of components on the customer side of the meter, according to the second example embodiment.

Referring now to FIGS. 7A-7D, a block diagram illustrating main components of the system 700 for providing a rapid threshold amount of power to a customer load during transfer between a primary power supply and a secondary power supply is shown, according to a second example embodiment. Specifically, FIG. 7A illustrates the communication network of the components of the system 700 that are in electrical communication with at least one processor, according to an example embodiment. FIG. 7B illustrates the power transmission between the components of the system that transmit power to the customer load, according to an example embodiment. FIG. 7C illustrates the metering system of the components of the system, according to an example embodiment. FIG. 7D is an overlay of FIGS. 7A-7C illustrating the system 700.

System 700 is configured for providing a rapid threshold amount of power to a customer load 722 during transfer between a primary power supply 710 and a secondary power supply 712, where the secondary power supply is not in electrical connectivity with the primary power supply. The secondary power supply is configured for generating electrical power. The system is electrically connected between a customer metering system on the customer side of the meter 724 and the customer load. The system includes the secondary power supply 712, a secondary power supply source 732 and an energy storage system 716. The system also includes a switching module 714. The primary power supply side of the meter 724 includes the meter 724, a service transformer 720, and the primary power supply 710.

In one embodiment, the switching module 714 may include a network 736, at least one processor 730, a generator circuit breaker 738, a battery circuit breaker 740, an interconnection protective relay 742, a primary power circuit breaker 744, and a group circuit breaker 746. The generator circuit breaker, the battery circuit breaker, the primary power circuit breaker, and the group circuit breaker may define automatic transfer switches of the switching module. The automatic transfer switch may include a 2000A-6000A switchgear up to 600 VAC. The automatic switch gear may include a 600A-2500A switchgear at 4160 VAC. Additionally, the automatic transfer switch may include up to 200 kAIC rated breakers and panels. The system includes circuit breakers including standard circuit breakers, ground fault circuit interrupter circuit breakers, arc fault circuit breakers, and other circuit breakers within the spirit and scope of the disclosure. The system also includes an interconnection protective relay configured to monitor the components of the system via the metering system of FIG. 7B. The interconnection protective relay detects power system problems and separates the local energy supply of the secondary power supply from the primary power supply. The interconnection protective relay may detect over/under-voltage, over/underfrequency, and rate of change of frequency of the system which may include the primary power supply parameters and the secondary power supply parameters and may send a corresponding signal, such as at least one first signal, the at least one processor for determining whether respective primary power supply thresholds and secondary power supply thresholds have been met.

In other embodiments, the switching module may include cloud services 728. The switching module is in communication with the secondary power supply 712 and the energy storage system 716 via the communication network 711 as indicated by the thin solid black line of FIG. 7A. The at least one processor 730 may include a microgrid controller and any device for the distribution of energy resources and loads in a predetermined electrical system to maintain frequency and voltage. In one embodiment, the switching module includes an automatic or automated transfer switch. The automatic transfer switch may include a 2000A-6000A switchgear up to 600 VAC. The automatic switch gear may include a 600A-2500A switchgear at 4160 VAC. Additionally, the automatic transfer switch may include up to 200 kAIC rated breakers and panels. In one embodiment, the switching module is configured within the enclosure such that the switching module can be accessed from the rear of the enclosure for maintenance.

The energy storage system includes a high discharge battery 734 where the high discharge battery is at least 2 C rating. The energy storage system is configured to rapidly discharge power to the customer load. In other embodiments, the system may support a high discharge battery of greater than 2 C, such as a 4 C rated high discharge battery. The high discharge battery may include lithium-ion batteries including, lithium cobalt oxide-, lithium nickel manganese cobalt oxide-, lithium nickel cobalt aluminum oxide, lithium titanate, and lithium iron phosphate-type batteries; lead acid and nickel cadmium batteries; and other batteries configured to rapidly discharge power to the customer load. In one embodiment, the energy storage system includes the high discharge battery 734, at least one inverter 718, and an isolation transformer 726. In another embodiment, the energy storage system may include all variations of chemical energy battery storage as well as other forms of mechanical energy storage such as pumped hydro, thermal energy storage, flywheel, etc. In one embodiment, the battery 734 may be a 1500 kWe/429 kWh Battery system at 7.5 C discharge rate. In one embodiment, the high discharge battery may include a 100 Ah LiFEPO4, lithium iron phosphate, modules. The high discharge battery complies with UL 1973 standards such that the secondary power supply includes a fire suppression system.

In one embodiment, the converter, which may also be referred to as 'at least one inverter,' may be a 1500 kWe at 600 VAC inverter. In another embodiment, the at least one inverter is a 1250 kW at 480 VAC. The at least one inverter includes AC breakers having shunt trips, DC disconnects, and DC input fuses. In another embodiment, the at least one inverter has a forced air-cooling system.

The energy storage system 716 is in electrical communication with the secondary power supply source 732. The switching module 714 is in electrical communication with the energy storage system where the switching module includes at least one set of contacts in communication with at least one inverter 718 of the energy storage system 716. The switching module is configured for switching between the primary power supply 710 and the secondary power supply 712.

In one embodiment, primary power supply 710 is at least one electric power grid and/or a collection of electric power grids configured to generate and distribute power across a plurality of customer loads. In one embodiment, primary power supply 710 is configured to utilize distributed resources, which may either be grid connected or independent of a grid. Examples of distributed resources include, but are not limited to, bio-massed generators, combustion turbines, thermal solar power and photovoltaic systems, fuel cells, wind turbines, microturbines, or any other applicable engines/generator sets and/or energy storage/control technologies.

The energy storage system 716 is energized and configured for allowing the system to fully recover the customer load 722 in less than one hundred milliseconds when system 200 is switching from the primary power supply to the secondary power supply 712. In another embodiment, the energy storage system is configured for allowing the system to providing a rapid threshold amount of power, at least five hundred kilowatts in one embodiment, the customer load 722 in at most four milliseconds when the system 200 is switching from the primary power supply to the secondary power supply. Such an embodiment can be achieved with a secondary power supply of at least five hundred kilowatts and a high discharge battery of at least 4 C discharge rate. In another embodiment, the secondary power supply may include a 1500 kWe/429 kWh secondary power supply source and an energy storage system having a high discharge battery at a 7.5 C discharge rate. However, other high discharge, high efficiency batteries may be used and are within the spirit and scope of the present disclosure.

In one embodiment, secondary power supply 712 may include a secondary power supply source 732 which may be an active distribution network, such as a microgrid or a collection of microgrids, configured to utilize a combination of distributed generation systems associated with primary power supply 710 and several types of loads at distribution voltage level. It is to be understood that secondary power supply 712 may also include micro sources which are renewable distributed energy resources integrated together for generating power at distribution voltage, various configurations of the integration and connectivity of primary power supply 710 and secondary power supply 712 are possible and within the spirit and scope of the claimed embodiments.

In certain embodiments, secondary power supply source 732 which may include any individual component or combination of a natural gas fuel powered generator, gasoline fuel powered generator, propane fuel powered generator, diesel fuel powered generator, solar fuel powered generator. If the secondary power supply source 732 is a generator set, for example, then the secondary power supply may be included in the enclosure (200 of FIG. 2). The secondary power supply may include modular components that may include at least a 500 kW generator or larger which may correspond to a high discharge battery of different discharge rates of at least 2 C. For example, the generator may include a 1000 kW, a 1500 kW or a 2000 kW generator. However, other size generators may be included and are within the spirit and scope of the present invention.

In one embodiment, the energy storage system 716 is in electrical communication with secondary power supply source 732. The energy storage system 716 is configured to use at least one inverter 718 to deploy power as alternating current. In one embodiment, energy storage system 716 may include a 4 C high discharge battery, where the high discharge battery satisfies at least one of NFPA 855 and UL 9540 standards. The NFPA 855 standards are the national fire protection association standard developed for the design, construction, installation, commissioning, operation, maintenance, and decommissioning of stationary energy storage systems including traditional battery systems such as those used by primary power supplies. The UL 9540 standards are energy storage system requirements defining installation codes containing size and separation requirements designed to prevent a fire originating in the energy storage system to propagate to adjacent energy storage systems. In one embodiment, the secondary power supply includes multiple energy storage systems where the system 200 satisfies UL 9540 standards to prevent the propagation of fire from a first energy storage system to a second energy storage system. To comply with NFPA 855 and UL 9540 standards, the system includes fire control, detection, and suppression systems.

In one embodiment, inverter 718 is a smart inverter configured to interact (either directly or via secondary power supply source 732) with at least one processor 730 enabling secondary power supply 712 to function as an internet of things (IOT)-based system configured to improve the efficiency of energy consumption associated with system 200 by allowing both primary power supply 710 and secondary power supply 712 to function as smart grids. In one embodiment, the at least one inverter is a bidirectional inverter operating at 50 and 60 Hz operation and is fully bidirectional. In one embodiment, the energy storage system 716 is a high discharge system configured to react based on data associated with customer load 722 or information received by the primary power supply or secondary power supply. In one embodiment, the at least one processor 730 may be a microgrid controller. In another embodiment, the at least one processor may include a processor configured for monitoring the communication within the system 200.

Energy storage system 716 in combination with at least one processor 730 is configured to generate one or more profiles for customer load 722 configured to be utilized by the at least one processor 730 to generate predictions in addition to adjust significant offsets between forecasts and actual demand associated with customer load 722. For example, the one or more load profiles may comprise data such as demand for a period of time (day, week, month, etc.), starting and stopping points associated with components of system 200, and other applicable energy metrics all of which are configured to be utilized by the at least one processor 730 to optimize functionality of system 200 and its components.

The at least one processor 730 may be included in the switching module 714 and may include any of the components of the switching module. In one embodiment, the components of system 200 are in electrical communication with the at least one processor 730 which is configured to predict, detect, and analyze functions and states of the components of system 200 in real-time via pluralities of data to interpret the health and states of system 200 and each of its components. For example, the at least one processor 730 may be a real-time monitoring module configured to interact with each of primary power supply 710, secondary power supply 712, and/or its applicable subcomponents to collect data such as frequency, voltage, current, power, state and any other applicable information associated with energy systems. In one embodiment, the real-time data acquired by the system is utilized by the at least one processor 730 to generate the one or more profiles of customer load 722. In one embodiment, at least one processor is configured to monitor a plurality of primary power parameters associated with customer load 722 derived from primary power supply 710 to detect if the plurality of utility supply parameters satisfies a plurality of utility power supply parameter thresholds. In one embodiment, the plurality of primary power supply parameters and the plurality of primary power supply parameter thresholds are established by at least one processor 730 based on the plurality of real-time monitoring module data collected by at least one processor indicating the health and/or status of system 200 and its components.

Similarly, in one embodiment, the at least one processor 730 is configured for determining if at least one primary power supply parameter fails to satisfy a respective primary power supply parameter threshold based on at least one first signal received from at least one first sensor 729 in electrical communication with the at least one processor and a remote processor communicatively coupled via a communications network with the at least one processor. The switching module is in communication with the cloud services which may include the network 736 and the remote processor, such remote or other remote computing device configured to interact with the controls of the processor. In FIGS. 7A-7D, the switching module includes the network 736 and is communication with cloud services 728 where cloud services 728 may include servers, databases, and remote computing devices having remote processors. In other embodiments, the switching module includes the cloud services 728.

In certain embodiments system 200 may further comprises cloud services 728 configured to be communicatively coupled to a network 736. In one embodiment, Cloud services may include diverse types of cloud computing systems. The cloud services may include resources such as data storage such as servers and processors, computing power, on-demand accessibility functions, and user interfaces without the direct active management by a user. In one embodiment, a network may include both the software and the hardware composing the system. The hardware may include computer electronic devices such as cables, switches, access points, modems, and routers, while the software may include operating systems, applications, firewalls, and the like. Referring to FIG. 7A, the components are communicatively interacting via a communication network 711 as indicated by the thinner solid black lines or conductors throughout the embodiment connecting the elements. The communicative network structure between the elements is not limited to the disclosed embodiment and may include a plurality of communicative network structures.

Referring to FIG. 7A specifically, the communication network 711 as indicated by the thin solid black line of FIG. 7A. operate to communicate the at least one processor with the components of the switching module and the components of the secondary power supply. The at least one processor may determine to switch from the primary power supply to the secondary power supply or vice versa based on the plurality of real-time data collected from at least one sensor of the communication network 711. The communication network 711 may include wires, conductors, and a plurality of sensors, including the at least one first sensor, configured to communicate with the at least one processor. The at least one processor is also configured for switching from the primary power supply to the energy storage system after the at least one processor determines the at least one primary power supply parameter fails to satisfy the respective primary power supply parameter threshold by sending at least one second signal to the switching module.

Primary power supply parameters may include any such parameters as recorded by meter 724 including but not limited to electricity usage. Primary power supply parameters may also include the status of the voltage from the primary power supply, the current, the time of day, the price of electricity from the primary power supply, the energy demand, and other parameters within the spirit and scope of the disclosure. Each primary power supply parameter will have a respective primary power supply parameter threshold predetermined by the customer. In one embodiment, the customer can control the respective primary power supply parameter threshold using cloud services 728 and the remote processing device. For example, if the primary power supply parameter is voltage the respective primary power supply parameter threshold may include a minimum voltage, such as zero, where the system 200 will switch to the secondary power supply because no power is being output to the load via the primary power supply and the primary power supply parameter fails to satisfy the respective primary power supply threshold. Additionally, if the primary power supply parameter is cost of electricity supplied by the primary power supply, then the respective primary power supply parameter threshold may include a maximum price per kilowatt where the system switches to the secondary power supply when the maximum price threshold is reached. The cloud services, including the servers, databases, and remote processors, may supply the at least one processor 730 with real time data to analyze and determine that the primary power supply parameter fails to satisfy the respective primary power supply threshold.

In one embodiment, switching module 714 is a plurality of automated transfer switches communicatively coupled to the at least one processor 730 configured to transfer power to and from primary power supply 710 and/or secondary power supply 712, depending on the configuration and status of system 200. For example, at least one processor 730 is configured to instruct switching module 714 to switch from primary power supply 710 to the secondary power supply 712 if the plurality of primary power supply parameters fails to satisfy the plurality of primary power supply parameter thresholds. In one embodiment, switching module 714 functions as a plurality of anti-islanding switches configured to ensure that inverter 718 is disconnected from the primary power grid if power associated with primary power supply 710 or secondary power supply 712 is down and to reconnect when the primary power supply 710 or secondary power supply 712 is functioning again.

Referring now to FIG. 7B, the thicker black lines represent voltage lines 790 of the system 200. The voltage lines 790 includes power transmission lines having conductive wires such as copper and aluminum wire. Active voltage lines are hot or live meaning that there is greater than zero voltage transmitting within the system. It is understood that the voltage lines 790 may be active at various times and the system is configured for switching 714 is configured for switching between the primary power supply and the secondary power source. In one embodiment, power may be supplied from the secondary power supply 712 including the secondary power supply source 732 and the energy storage system 716 to components of the switching module 714, and subsequently to the customer load 722. In one embodiment, the voltage lines may be active as defined by the live power transmission emitting from the primary power supply to the load. In another embodiment, the voltage lines may be active as defined by the live power transmission, voltage greater than zero, emitting from the secondary power source, through the switching module, to the load. The energy storage system is energized such that it always maintains active transmitting from the energy storage system to the switching module. Specifically, the energy storage system includes active voltage lines that transmit power up to the group circuit breaker 746. By always maintaining an active voltage, the system is capable minimizing recovery time of power to the load such that full load recovery is provided within one hundred milliseconds. The system provides a rapid threshold amount of power to the load during transfer between the primary power supply and the secondary power supply because the energy storage system is energized. Because the energy storage system is energized and contains high discharge batteries, when the primary power supply parameters fail, the high discharge batteries rapidly discharge power to the load depending on the discharge rate of the high discharge battery. In each embodiment, the at least five hundred kilowatts of power is transmitted to the load from the secondary power source within at most four milliseconds.

The switching module maintains the set of contacts in electrical communication with the at least one inverter of the secondary power supply such that the switching occurs to provide a rapid threshold amount of power to the customer load 722 during transfer between a primary power supply and a secondary power supply. The energy storage system maintains a hot voltage line to the load providing the threshold amount of power, depending on the size and discharge rate of the high discharge battery 734, to the load when the primary power supply parameters fail to satisfy the primary power supply parameter thresholds. The energy storage system is configured to rapidly discharge power to the customer load such that a full customer load recovery is provided in less than one hundred milliseconds.

When the switching module switches solely to the secondary power supply, the power and voltage is supplied by the load at least primarily using the secondary power supply source where the at least one processor 730 is further configured for engaging, concurrently with switching from the primary power supply to the energy storage system, the secondary power supply source after the at least one primary power supply parameter fails to satisfy the respective primary power supply parameter threshold by sending the at least one second signal. Engaging the secondary power supply may include at least starting the secondary power supply source, which may include at least starting a generator. In one embodiment, starting a generator shall mean starting the motor of the generator so that the generator may begin to provide power. In one embodiment, switching from the primary power supply to the energy storage system occurs within at most four milliseconds.

The at least one processor is configured for switching from the energy storage system to the secondary power supply source after at least one secondary power supply parameter satisfies a respective secondary power supply parameter threshold by sending at least one third signal to the secondary power supply. The system is further configured such that the at least one processor is configured for, after engaging the secondary power supply source, determining if the at least one secondary power supply parameter satisfies the respective secondary power supply parameter threshold. After engaging the secondary power supply source, the at least one processor is configured for determining if the at least one secondary power supply parameter satisfies the respective secondary power supply parameter threshold. If the at least one secondary power supply parameter satisfied the at least one secondary power supply parameter threshold, then switching from the primary power supply to the secondary power supply. The secondary power supply parameter may include for example, voltage, current, power, which must be maintained between its respective primary power supply parameter threshold having a minimum and maximum secondary power supply voltage for example. Determining that the secondary power supply parameter satisfies the secondary power supply parameter threshold may ensure that the load will receive the necessary load output of at least 500 kW and that the system is not overheating as to cause a fire and to comply with NFPA 855 and UL 9540 standards. Other secondary power supply parameters, including the same type of parameters used for the primary power supply parameters may be used and are within the spirit and scope of the present invention.

Also, the secondary power supply thresholds may include minimums and maximums, such as minimum voltage output. Other types of thresholds may be included and are within the spirit and scope of the disclosure. After switching from the primary power supply to at least one of the energy storage system and the secondary power supply source, the at least one processor is configured for sending a fourth signal to the switching module to switch back to the primary power supply if the at least one processor determines the at least one primary power supply parameter satisfies the respective primary power supply parameter threshold. In certain embodiments, the secondary power supply 712 may include at least one first sensor 731 such that the at least one first sensor is configured to monitor at least one of the secondary power supply source and the at least one inverter. The at least one first sensor is configured monitor the at least one of a plurality of secondary power supply parameters of the secondary power supply and transmit the data via the at least one first signal to the at least one processor for determining whether the secondary power supply parameter thresholds have been met. The at least one first sensor communicates with the at least one processor via the communications network of FIG. 7A.

Referring to FIG. 7C specifically, it is to be understood that metering system 794 may be different types of metering systems. The metering system may include components within a vault, components within an entire vault, flat-rate, interval, solar and smart meters net meters systems, bi-directional metering systems and dual metering systems. However, it is understood that other types of meters may be included and are within the spirit and scope of the present disclosure. The metering system is configured to monitor parameters of the system, including parameters attributable to the transmission of power to the loads from the primary power supply and secondary power supply. The metering system may monitor the status of voltage, for example, at different components within the system. In other embodiments, the metering system 794 may also include a plurality of sensors, including at least one first sensor 730, in communication with the at least one processor 730 via the components of the system. The at least one first sensor may be configured to transmit metering information via the at least one first signal, including voltage status, to the at least one processor via the communications network of FIG. 7A. It is understood that the system 200 is positioned between customer load 722 and meter 724 such that the metering system 794 is on the customer side of the meter.

Referring to FIG. 7D specifically, the system 200 including the switching module and the secondary power supply is shown illustrating the communication network 711, the metering system 794, and the active power lines 790 of the system as they interact with the components of the system, the customer load 722, and the primary power supply 710 according to an example embodiment. The at least one first sensor (729, 731, and 733) are configured to communicate with the at least one processor 730 via the communication network 711. In certain embodiments, the sensor may be a sensor configured to monitor certain electrical attributes of the components of the system. For example, sensors may be used to monitor voltage and current and are used for voltage and current monitoring, logging, or proof-of-operation applications. Such sensors may include multi-range AC current transducers, DC current transducers, AC current transformers, Voltage transducers (AC and DC), High-performance transducers, digital current sensor, and voltage monitors. Other embodiments of voltage and current sensors may be used and are within the spirit and scope of the present invention. In other embodiments, at least one first sensor may include a plurality of different types of sensors including temperature sensors, proximity sensors, infrared sensors, ultrasonic sensors, light sensors, smoke and gas sensors, touch sensors, color sensors, humidity sensors, etc. such that the at least one first sensor is configured to monitor the components of the system and its respective parameters. The at least one first sensor is configured to send the at least one first signal to the at least one processor. The at least one first signal contains information and data relative to the respective parameter of the components of the system. Sensors (729, 731, and 733) are positioned proximate to certain embodiments in the figures, but it is understood that these sensors may be positioned, and others may be positioned throughout the system to monitor the states of the system.

Figure 8A:
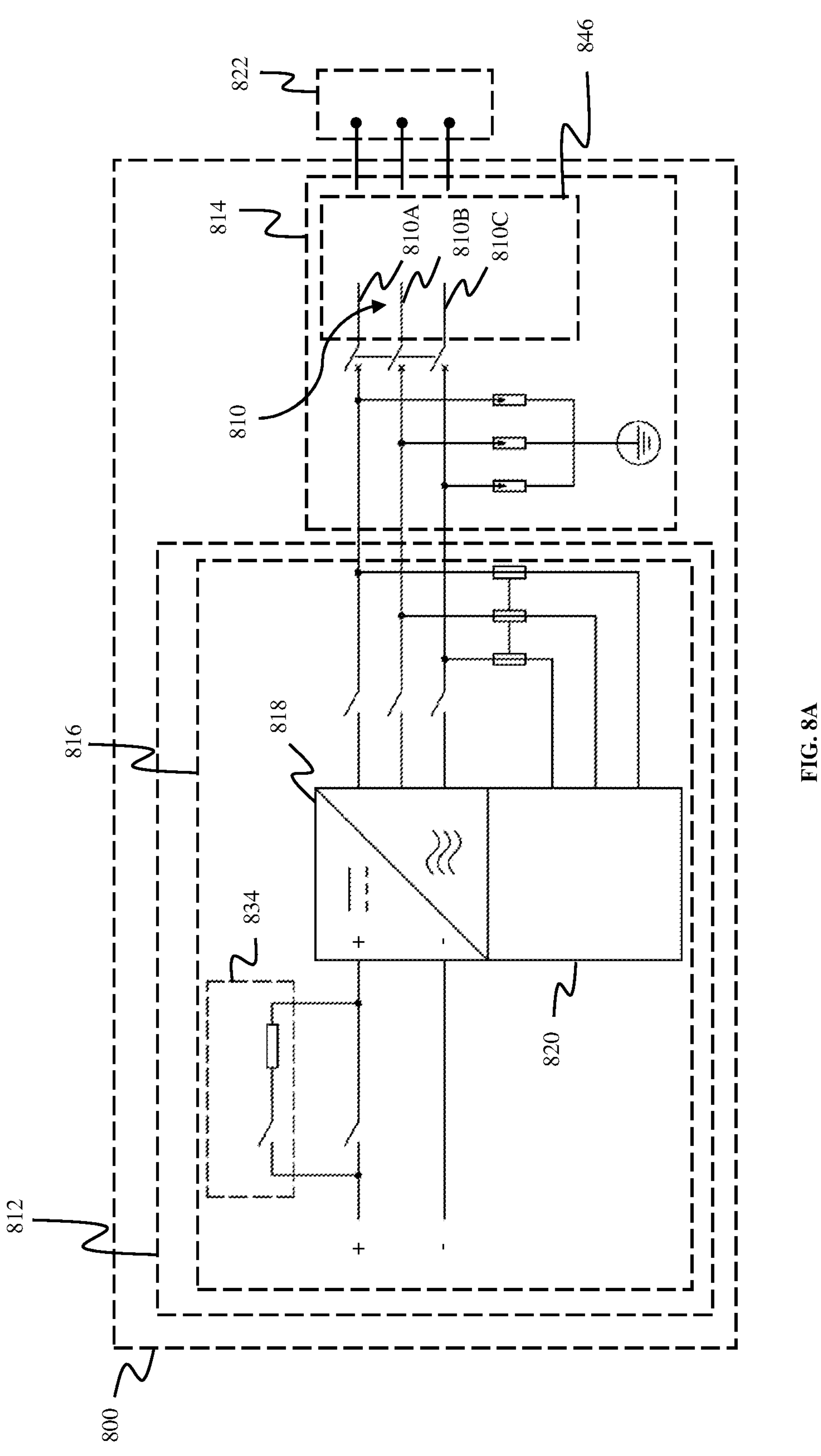
FIG. 8A is a diagram illustrating the switching module including a set of contacts in communication with at least one inverter of the energy storage system, according to an example embodiment.

Referring now to FIG. 8A, a diagram illustrating the switching module 814 including a set of contacts 810 in communication with at least one inverter 818 of the energy storage system 816 is shown, according to an example embodiment. The switching module 814 includes a set of contacts 810 in communication with the at least one inverter 818. In one embodiment, the switching module 814 includes the set of contacts 810 including at least one of contact 810A, contact 810B, and contact 810C where contact 810A, contact 810B, and contact 810C are voltage sense lines. The set of contacts 810 may include voltage sense lines connected in circuitry to the at least one inverter of the secondary power supply such that the secondary power supply is energized in connection with the switching module. The circuitry may include, but is not limited to, connection to resistors, fuse protectors, ground connections, and connection to an isolation transformer of the secondary power supply 812. The set of contacts in communication with the at least one inverter is configured to supply voltage from the secondary power supply to the customer load 822 via the switching module 814. While the primary power supply satisfies its primary power supply thresholds, the energy storage system is energized such that there is active voltage across the set of contacts from the energy storage system up to the group circuit breaker 846 of the switching module. The set of contacts transmits active voltage between the switching module and the secondary power supply so that the system can rapidly discharge a threshold amount of power to the customer load during transfer between the primary power supply and the secondary power supply. Because the voltage is active up to the group circuit breaker, when the primary power supply threshold fails, and the system switches from the primary power supply to the secondary power supply, the power from the system only have to be discharged from the group circuit breaker to the load, minimizing power transmission downtime. Therefore, because the voltage is active across the set of contacts, at least 500 kW of power is provided to the load within four milliseconds.

As illustrated in FIG. 8A, the system 800 includes a high discharge battery 834 in communication with at least one inverter where the at least one inverter is in communication with the set of contacts of the switching module. In certain embodiments, the high discharge battery may be a direct current (DC) power source or an alternating current (AC) power source. The high discharge battery may be connected to the positive terminal input of the at least one inverter. The at least one inverter may be in communication with a surge protector 820. The set of contacts 810 may include a connection to at least one output of the at least one inverter, where in the example embodiment, the at least one inverter has a 3-phase output.

In another embodiment, the set of contacts 810 may be in communication with an isolation transformer between the connection to the outputs of the at least one inverter such that the isolation transformer includes a high resistance material and is configured to transfer the power from a high discharge battery, which is converted from direct current to alternating current, to the load. The isolation transformer may be used to transfer the power between the circuits of the secondary power supply and the switching module to be further configured to power the customer load 822.

In another embodiment, the set of contacts of the switching module connects the at least one inverter to the load to enable the energy storage system to provide a rapid threshold amount of power to the load during transfer between the primary power supply and the secondary power supply. If the secondary power supply parameter threshold is satisfied, then the system will switch from the primary power supply to the secondary power supply. If the secondary power supply parameter threshold fails, then the system may abort switching to the secondary power supply in which case the system, being in communication with the at least one processor, will send the at least one first signal to the at least one processor indicating the health and status of the secondary power supply.

Figure 8B:
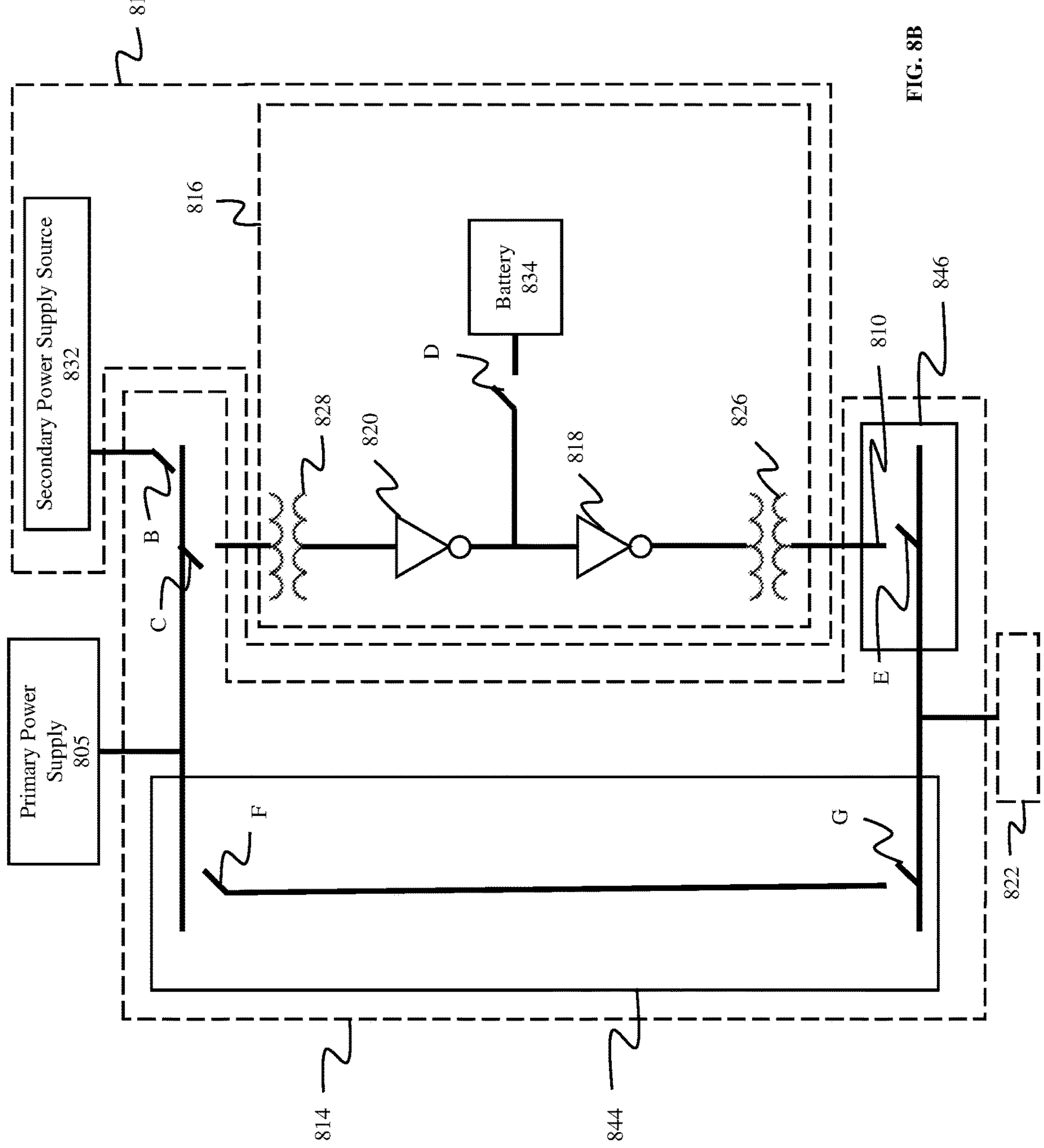
FIG. 8B is a diagram illustrating the system for conditioning and maintaining power transmitted to a customer load, according to a third example embodiment.

Referring now to FIG. 8B, the secondary power supply having the converter and the inverter in electrical communication with the switching module is shown, according to a third example embodiment. The system includes two inverters, inverter 818 and inverter and/or converter 820. In some embodiments, depending on the primary power supply, inverter 820 may include a converter configured to convert electrical power from alternating current to direct current. In the embodiment having two inverters, switch gate F and switch gate G are normally open; this is the global bypass. The at least one processor will send a signal to close switch gate F and switch gate G during at least one of system maintenance and system failure of at the at least one inverter, inverter/converter 820 and inverter 818, thereby creating a global bypass 844 for the system. The system will the reroute the electrical energy from the secondary power supply 812 through the global bypass instead of transferring the electrical power across switch gate E. Additionally, if the at least one processor determines that system maintenance needs to be performed on the energy storage system 816, then the at least one processor will transmit a signal to open switch gate C and switch gate D, which are normally closed. By opening switch gate C and switch gate D, the energy storage system is isolated from any power supply, namely, primary power supply 805 and secondary power supply source 832, and the customer load. In additional embodiments, the processor may be configured to open switch gate D to isolate the inverter system from the at least one high discharge battery stack 834. By incorporating the switch gates in the specific arrangement as disclosed, the system eliminates the possibility of accidental contact with live electrical components, reducing the risk of injury or electrocution during maintenance and/or repair. Additionally, the system improves over the prior art by allowing the processor to determine when it is necessary to disconnect certain components from the circuit to mitigate the risk of damage to electrical components. For example, it the processor determines that the at least one primary power supply parameter is representative of unstable power (e.g. power surges and voltage spikes), then the at least one processor may disconnect the primary power supply from the energy storage system by opening switch gate C, similarly, if the customer load includes sensitive equipment, then the at least one processor may want to ensure that the customer load is only receiving power clean of voltage drops and spikes to eliminate the harm of damage to the load.

Electrical power from the primary power supply is configured to transfer across switch gate C, which is normally closed in this embodiment, to the energy storage system, and across a first isolation transformer 828 to the inverter/converter 820. Where the primary power supply includes alternating current, inverter 820 will output direct current. The electrical power then transmits across inverter 818 amplifying the power. The electrical power then transmits across the isolation transformer 826 and the set of contacts 810 of the switching module. In this embodiment, the energy storage system remains energized up until contacts with the group circuit breaker 846 of the switching module, drawing power from the primary power supply. Switch gate D is closed and connected to the high discharge battery maintaining the connection with within the system to be able to rapidly discharge the power from the high discharge batteries to the load when the at least one processor is transferring between the primary power supply and the secondary power supply. The system having two inverters cleans the electrical energy from the primary power supply such that it is free from voltage spikes and drops while transmitting to the load. This two-inverter system eliminates the need for many different components of certain electrical systems. In the embodiment with two inverters, voltage is biased across the at least one inverter, such as inverter/converter 820, such that the system is configured not to engage or discharge the high discharge batteries while the voltage is being transmitted from the primary power supply.

When the at least one processor determines the at least one primary power supply parameter fails to satisfy the respective primary power supply parameter threshold, the at least one processor will switch to the secondary power supply by sending at least one second signal to the switching module. The at least one second signal may include closing and opening a plurality of switch gates. For example, in one embodiment, the second signal may be configured to close switch gate B, and in other embodiments such as the first embodiment in FIG. 2, open a switch gate in connection between the primary power supply and the switching module. The at least one processor may send at least one second signal to the at least one inverter, such as inverter/converter 820, biasing the voltage to discharge the high discharge battery. The high discharge battery will then rapidly discharge electrical power to the load from the high discharge battery 834, to the inverter 818, across the isolation transformer 826 and the set of contacts 810 to the group circuit breaker 846 of the switching module 814. The at least one second signal may include switching the group circuit breaker to allow the electrical power to transfer to the load. When the at least one processor switches to the secondary power supply source, the power from the secondary power supply source transmits across switch gate B and C to the energy storage system, through inverters 820 and 818, across the set of contacts of the switching module, to the load. Thereby, the electrical power transmitted to the load from the secondary power supply source is cleaned to remove voltage spikes and drops across the system. In another embodiment, when the at least one processor switches to the secondary power supply source, the electrical power transmits across switch gate B to the generator circuit breaker, to the group circuit breaker, and to the load.

Figure 9:
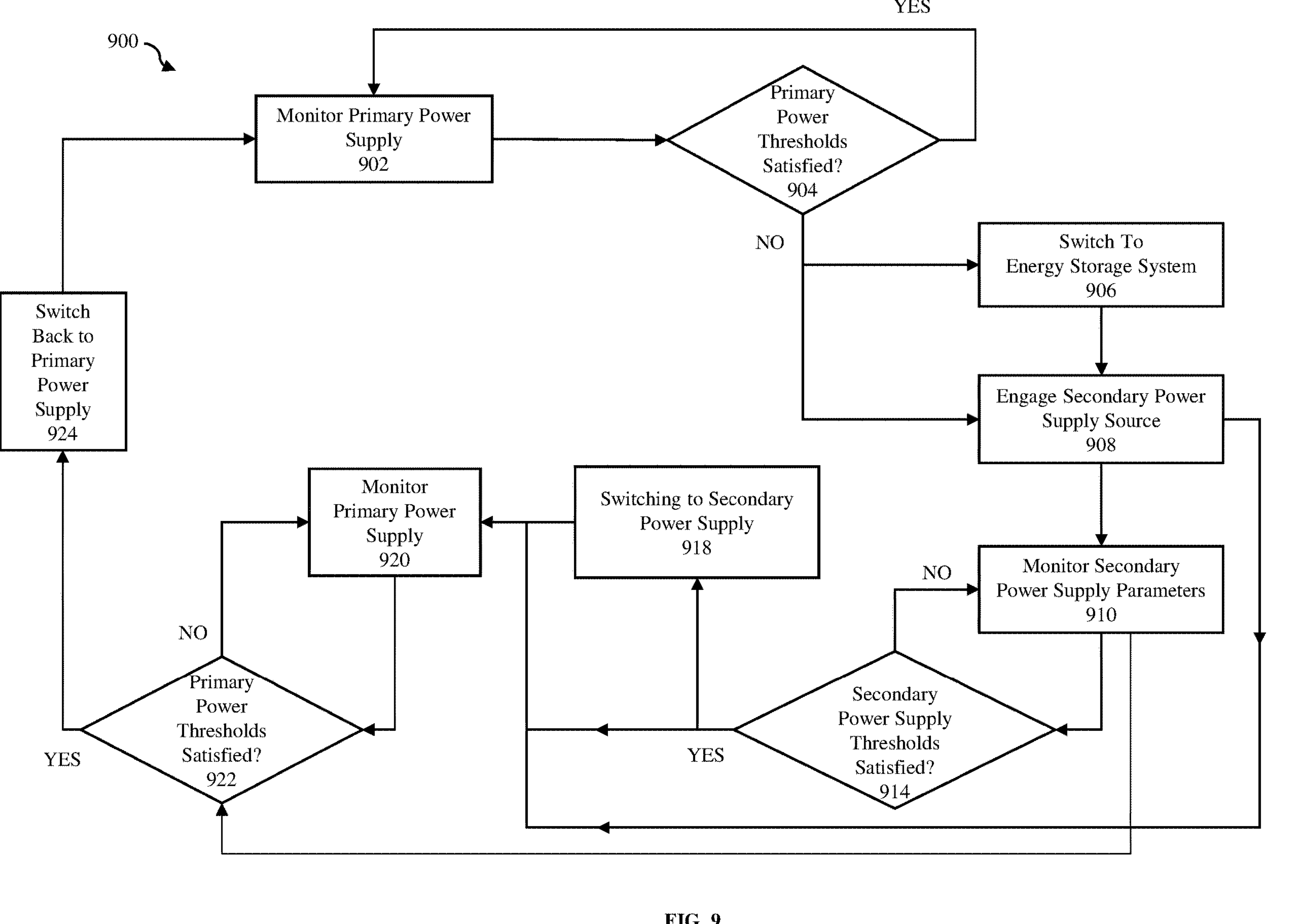
FIG. 9 is a block diagram illustrating an exemplary method for providing a rapid threshold amount of power to a customer load during transfer between a primary power supply and a secondary power supply is shown, according to a second example embodiment.

Referring now to FIG. 9, a block diagram illustrating an exemplary method 900 for providing a rapid threshold amount of power to a customer load during transfer between a primary power supply and a secondary power supply is shown, according to an example embodiment. It is to be understood that at least one processor of the system is configured to be continuously monitoring the functionality of system throughout each step-in method 900, and that no particular step must be performed for the at least one processor to perform the undermentioned tasks.

At step 902, at least one processor monitors the plurality of primary power supply parameters of primary power supply connected to customer load to determine whether the plurality of primary power supply parameters fails to satisfy the plurality of primary power supply parameter thresholds. It is to be understood that at least one processor continuously performs the monitoring functions based on the aforementioned real-time data collected. The real time data may be transmitted via the at least one first signal to the at least one processor from the components of the system that are in communication with the at least one processor. Additionally, cloud services, including a remote processor, may communicate real time data with the at least one processor. The failure of the primary power supply may occur for a plurality of different reasons. For example, a failure to satisfy the plurality of primary power supply parameter thresholds may be caused by common factors, such as but not limited to, outages, stress caused by voltage, frequency fluctuations, faults, or any other applicable disruption or adjustment of power. However, other reasons may also be applicable and are within the spirit and scope of the present invention. For example, primary power supply parameters such as price, power demand from load, and time of day, may alter the primary power supply thresholds and cause the system to switch from the primary power supply to the secondary power supply when the primary power supply thresholds fail.

At step 904, at least one processor determines whether at least one primary power supply parameter fails to satisfy a respective primary power supply parameter threshold based on at least one first signal received from at least one first sensor in electrical communication with the at least one processor and a remote processor communicatively coupled via a communications network with the at least one processor based on a combination of the collected real-time data and the one or more generated profiles of customer load. If the plurality of primary power supply parameter thresholds is not satisfied, then the system moves to step 906 where the at least one processor switches from the primary power supply to the energy storage system after the at least one processor determines the at least one primary power supply parameter fails to satisfy the respective primary power supply parameter threshold by sending at least one second signal to the switching module. The at least one second signal may include electrical signals having information configured to execute the functions of the switching module. Because the energy storage system is energized such that there is active voltage from the energy storage system up to the group circuit breaker of the switching module, the system can rapidly discharge power to the load as the system switches to the secondary power supply, namely, the secondary power supply source. Therefore, the system can provide full customer load recovery in less than one hundred milliseconds which may resolve the current issues mission critical facilities face with existing technology.

In step 906, and concurrently with step 908, the switching module is utilized to switch from primary power supply to energy storage system allowing energy storage system to function in a high performance/discharge manner due to the energy capacity of the high discharge battery. In one embodiment, the switch from primary power supply to energy storage system occurs within 4 milliseconds after the at least one processor makes the decision to switch from the primary power supply to the secondary power supply. This is important because it allows for full load recovery in an exceedingly small amount of time. In one embodiment, the system is configured that the threshold amount of power to customer load is provided by the applicable energy power supply in less than one hundred milliseconds. Additionally, it is understood that executing the switch from the utility power supply to the energy storage system occurs within four milliseconds after making the determination to switch from the primary power supply to the secondary power supply. At the same time step 906 occurs, or shortly thereafter, step 908 occurs.

In step 908, at least one processor engages, concurrently with switching from the primary power supply to the energy storage system in step 906, the secondary power supply source after the at least one primary power supply parameter fails to satisfy the respective primary power supply parameter threshold by sending the at least one second signal.

In one embodiment, engaging secondary power supply source may include initiating or starting up a generator, conducting switching of an alternate electrical grid or other power source so that the secondary power supply source is ready to provide power to the load. However, it is understood that other means of engaging the secondary power supply source may be used and is within the spirit and scope of the present invention. After the secondary power supply source has been engaged, step 910 occurs.

In step 910, at least one processor continuously monitors a plurality of secondary power supply parameters of the secondary power supply to determine if the plurality of secondary power supply parameters satisfy a plurality of secondary power supply parameter thresholds. In certain embodiments, the at least processor may also at the same time continue to monitor the primary power source threshold such that the switch back to the primary power supply before switching from the energy storage system to the secondary power supply source.

At step 914, at least one processor decides whether the plurality of secondary power supply parameters satisfy the plurality of secondary power supply parameter thresholds. In step 914, if the plurality of secondary power supply parameters satisfies the plurality of secondary power supply parameter thresholds, then the process moves to step 918.

In step 918, at least one processor switches from the energy storage system to the secondary power supply source after at least one secondary power supply parameter satisfies a respective secondary power supply parameter threshold by sending at least one third signal to the secondary power. The third signal is an electrical signal including information configured to execute the functions of the secondary power supply, for example, the third signal may contain information to engage the secondary power supply source, which may include starting a generator in one example embodiment. It is to be understood that after the switch from energy storage system to secondary power supply occurs, then the process moves to step 920 and step 921.

In one embodiment, in step 920, following the switch to secondary power supply at step 918, the switching module is in communication with the at least one processor. The at least one processor monitors the primary power supply at step 920 using the communications network in communication with the components of the system. The communications network may include at least one first signal configured to monitor the primary power supply by measuring primary power supply parameters at certain components within the system via the metering system. At least one processor monitors the plurality of primary power supply parameters of the primary power supply connected to customer load to detect if the plurality of primary power supply parameters continues to satisfy the plurality of primary power supply parameter thresholds. At during any step of method 900, at which point the at least one processor determines that at least one primary power supply parameters satisfy its respective primary power supply parameter threshold, then the at least one processor is configured to switch form the secondary power supply back to the primary power supply.

At step 922, at least one processor determines whether at least one primary power supply parameter fails to satisfy a respective primary power supply parameter threshold based on at least one first signal received from at least of (i) at least one first sensor in electrical communication with the at least one processor and (ii) a remote processor communicatively coupled via a communications network with the at least one processor based on a combination of the collected real-time data and the one or more generated profiles of customer load. It is to be understood that a failure to satisfy at least one of the primary power supply parameter thresholds may be caused by common factors, such as but not limited to, outages, stress caused by voltage, frequency fluctuations, faults, or any other applicable disruption or adjustment of power. If the at least one processor determines that at least one of the primary power supply parameter thresholds is satisfied, then the process moves to step 924.

In step 924, the automated transfer switches of the switching modules will switch power back to the primary power supply from the secondary power supply. The at least one processor is configured for sending a fourth signal to the switching module to switch back to the primary power supply if the at least one processor determines the at least one primary power supply parameter satisfies the respective primary power supply parameter threshold. The at least one fourth signal may include electrical signals having information configured to execute the functions of the switching module. If the utility power supply parameters fail to satisfy the utility power supply thresholds, then the process moves back to step 920, and the system continues to monitor the primary power supply parameters and to determine when it is appropriate to move back to the primary power supply when the at least one processer determines that the primary power supply thresholds are satisfied.

In step 924, when the primary power supply parameters are satisfied, then the system transfers power from the secondary power supply to back to the primary power supply. The switching module is utilized in step 924 to execute the switch from the secondary power supply to the primary power supply and then at least one processor proceeds to continuously monitor the components of system at step 902 to determine whether the primary power parameter thresholds are satisfied.

In another embodiment, exemplary method 900 may include cleaning the electrical power, such that the system includes two inverters and the electrical power from the primary power source is cleaned. By cleaning the electrical power, the electricity across the system and transferred to the load is free from voltage spikes and drops.

Figure 10:
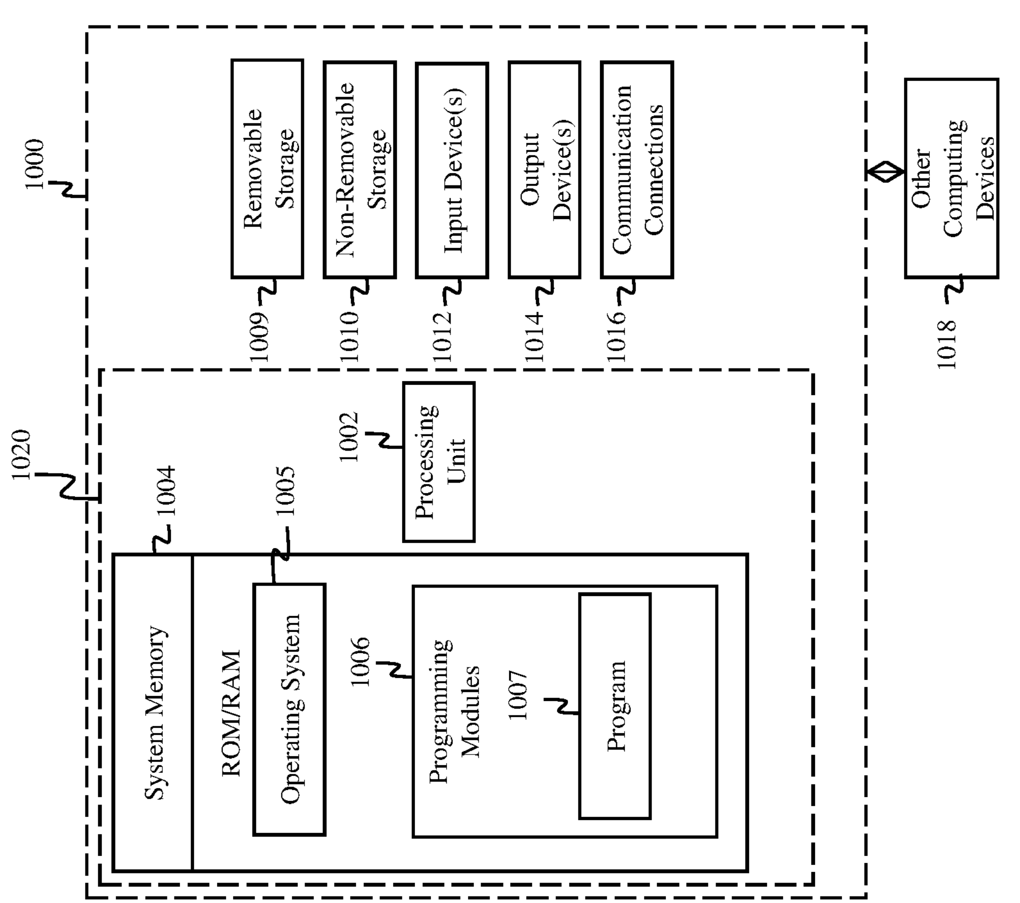
FIG. 10 illustrates a computer system according to exemplary embodiments of the present technology.

Referring now to FIG. 10, a block diagram of a system including an example computing device 1000 and other computing devices is shown, according to an example embodiment. Consistent with the embodiments described herein, the aforementioned actions performed by system 200 may be implemented in a computing device, such as the at least one processor. Any suitable combination of hardware, software, or firmware may be used to implement the at least one processor. The aforementioned system, device, and processors are examples and other systems, devices, and processors may comprise the aforementioned computing device. Furthermore, the at least one processor may comprise an operating environment for system 200 and method 300. Processes, data related to system 200 may operate in other environments and are not limited to the at least one processor.

A system consistent with an embodiment of the disclosure may include a plurality of computing devices, such as a computing device 1000 of FIG. 10. In a basic configuration, computing device 1000 may include at least one processing unit 1002 and a system memory 1004. Depending on the configuration and type of computing device, system memory 1004 may comprise, but is not limited to, volatile (e.g., random access memory (RAM)), non-volatile (e.g., read-only memory (ROM)), flash memory, or any combination or memory. System memory 604 may include operating system 1005, and one or more programming modules 1006. Operating system 1005, for example, may be suitable for controlling computing device 1000's operation. In one embodiment, programming modules 1006 may include, for example, a program module 1007 for executing the methods illustrated in FIG. 3. Furthermore, embodiments of the disclosure may be practiced in conjunction with a graphics library, other operating systems, or any other application program and is not limited to any particular application or system. This basic configuration is illustrated in FIG. 10 by those components within a dashed line 1020.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and nonvolatile, removable, and non-removable media implemented in any method or technology for storage of information, such as computer readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 1000. Any such computer storage media may be part of system 200. Computing device 1000 may also have input device(s) 1012 such as a keyboard, a mouse, a pen, a sound input device, a camera, a touch input device, etc. Output device(s) 1014 such as a display, speakers, a printer, etc. may also be included. The aforementioned devices are only examples, and other devices may be added or substituted.

Computing device 1000 may also contain a communication connection 1016 that may allow system 200 to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1004, including operating system 1005. While executing on at least one processing unit 1002, programming modules 1006 (e.g., program module 1007) may perform processes including, for example, one or more of the steps of a process. The aforementioned processes are examples, and at least one processing unit 1002 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged, or integrated electronic chips containing logic gates, a circuit utilizing a microprocessor, or on a single chip (such as a System on Chip) containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. It is also understood that components of the system may be interchangeable or modular so that the components may be easily changed or supplemented with additional or alternative components.

While certain embodiments of the disclosure have been described, other embodiments may exist. Furthermore, although embodiments of the present disclosure have been described as associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' steps may be modified in any manner, including by reordering steps and/or inserting or deleting steps, without departing from the disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for conditioning and maintaining power transmitted to a customer load from at least one of a primary power supply and a secondary power supply, wherein the method comprises:

- receiving a first input from at least one of (i) a primary power supply and (ii) a secondary power supply;
- converting the first input from the at least one of (i) the primary power supply and (ii) the secondary power supply to a first output using a converter;
- continuously adjusting at least one converter power parameter to satisfy at least one inverter power parameter;
- determining whether the first output transmitted from the converter to an inverter satisfies the at least one inverter power parameter;
- if the first output transmitted from the converter to the inverter satisfies the at least one inverter power parameter, then not charging and not discharging at least one high discharge battery stack;
- if the first output transmitted from the converter fails to satisfy the at least one inverter power parameter, then discharging a high-discharge battery stack to supplement the converter output and maintain the inverter output within the at least one inverter power parameter;
- converting a second input from at least one of (i) the converter and (ii) the at least one high discharge battery stack of at least 2 C to a second output using the inverter;
- supplying power to the customer load without altering load demand.

2. The method of claim 1, wherein the at least one converter power parameter comprises at least one of (i) a voltage set point, (ii) a frequency, (iii) an input voltage, (iv) an output voltage range, (v) an output power rating, (vi) an efficiency, (vii) a waveform, (viii) a surge capability, (ix) a total harmonic distortion, (x) an overload protection, and (xi) a cooling method.

3. The method of claim 2, wherein the at least one converter power parameter consists of the voltage set point.

4. The method of claim 3 wherein continuously adjusting the at least one converter power parameter to satisfy the at least one inverter power parameter comprises adjusting the voltage set point continuously between every 25 to 75 milliseconds.

5. The method of claim 1, wherein the at least one inverter power parameter comprises at least one of (i) a voltage set point, (ii) a frequency, (iii) an input voltage, (iv) an output voltage range, (v) an output power rating, (vi) an efficiency, (vii) a waveform, (viii) a surge capability, (ix) a total harmonic distortion, (x) an overload protection, and (xi) a cooling method.

6. The method of claim 5, wherein the at least one inverter power parameter consists of the output voltage range.

7. The method of claim 1 comprising monitoring at least one primary power supply parameter.

8. The method of claim 7 wherein the at least one primary power supply parameter comprises at least one of (i) a voltage range, (ii) a frequency range, (iii) a power factor, (iv) a phase angle, (v) a distortion presence, (vi) a distortion range, (vii) a cost for power, (viii) a time of day of power transmission, and (ix) an overall consumer demand level.

9. The method of claim 7 further comprising generating a graphical display comprising (i) a real-time monitoring of the at least one power supply parameter, and (ii) at least one of (1) a minimum threshold level and a (2) maximum threshold level for the at least one power supply parameter.

10. The method of claim 9 comprising determining whether the at least one primary power supply parameter fails to satisfy a respective primary power supply parameter threshold.

11. The method of claim 10 wherein determining whether the at least one primary power supply parameter fails to satisfy the respective primary power supply parameter threshold comprises receiving at least one first signal from at least one of (i) at least one first sensor in electrical communication with at least one processor and (ii) a remote processor communicatively coupled via a communications network to the at least one processor.

12. The method of claim 11 comprising switching to the secondary power supply if the at least one primary power supply parameter fails to satisfy the respective primary power supply parameter threshold.

13. The method of claim 1 wherein the at least one high discharge battery stack comprises at least 860 volts of nominal voltage.

14. The method of claim 1, wherein the at least one high discharge battery stack is at least 3 C.

15. The method of claim 1 comprising:

- wherein if the first input is received from the primary power supply then transmitting power across a first switch gate, which is normally closed, across a first isolation transformer to the converter, then to the inverter, and then across a second isolation transformer to the customer load;
- wherein if the first input is received from the secondary power supply, then closing a second switch gate thereby electrically connecting the secondary power supply to the converter, adjusting the at least one converter power parameter such that power is transmitted from the secondary power supply to the converter to the at least one high discharge battery stack for charging the at least one high discharge battery; discharging power from the at least one high discharge battery stack to the inverter; and transmitting power to the customer load.

16. The method of claim 15 further comprising opening the first switch gate.

17. A method for conditioning and maintaining power transmitted to a customer load from at least one of a primary power supply and a secondary power supply, wherein the method comprises:

determining whether at least one primary power supply parameter fails to satisfy a respective primary power supply parameter threshold;

if the at least one primary power supply parameter satisfies the respective primary power supply parameter threshold, then receiving, at a converter, a first input from the primary power supply;

if the at least one primary power supply parameter fails to satisfy the respective primary power supply parameter threshold, then receiving, at the converter, the first input from the secondary power supply;

converting the first input to a first output using the converter;

determining whether the first output satisfies at least one inverter power parameter;

if the first output transmitted from the converter satisfies the at least one inverter power parameter, then not charging and not discharging at least one high discharge battery stack;

if the first output transmitted from the converter fails to satisfy the at least one inverter power parameter, then discharging the at least one high discharge battery stack;

continuously adjusting at least one converter power parameter to satisfy at least one inverter power parameter, wherein the at least one converter power parameter comprises at least one of (i) a voltage set point, (ii) a frequency, (iii) an input voltage, (iv) an output voltage range, (v) an output power rating; and wherein the at least one inverter power parameter is an output voltage range;

converting a second input from at least one of (i) the converter and (ii) the at least one high discharge battery stack to a second output using the inverter; and supplying power to the customer load.

18. The method of claim 17, wherein the at least one high discharge battery stack is electrically connected between the converter and the inverter such that the primary power supply cannot charge the at least one high discharge battery stack in an ideal normal state.

19. A method for conditioning and maintaining power transmitted to a customer load from at least one of a primary power supply and a secondary power supply, wherein the method comprises:

receiving at least one first signal received at least one of (i) at least one first sensor in electrical communication with at least one processor and (ii) a remote processor communicatively coupled via a communications network to the at least one processor, the at least one first signal comprising at least one primary power supply parameter;

generating and displaying a graphical display comprising (i) a real-time monitoring of the at least one power supply parameter, and (ii) at least one of (1) a minimum threshold level and a (2) maximum threshold level for the at least one power supply parameter;

determining whether at least one primary power supply parameter fails to satisfy a respective primary power supply parameter threshold;

if the at least one primary power supply parameter satisfies the respective primary power supply parameter threshold, then receiving, at a converter, a first input from at least one the primary power supply;

if the at least one primary power supply parameter fails to satisfy the respective primary power supply parameter threshold, then receiving, at the converter, the first input from the secondary power supply;

converting the first input to a first output using the converter;

determining whether the first output satisfies at least one inverter power parameter;

if the first output transmitted from the converter satisfies the at least one inverter power parameter, then not charging and not discharging at least one high discharge battery stack;

if the first output transmitted from the converter fails to satisfy the at least one inverter power parameter, then discharging the at least one high discharge battery stack;

continuously adjusting at least one converter power parameter to satisfy at least one inverter power parameter, wherein the at least one converter power parameter comprises at least one of (i) a voltage set point, (ii) a frequency, (iii) an input voltage, (iv) an output voltage range, (v) an output power rating; and wherein the at least one inverter power parameter is an output voltage range;

converting a second input from at least one of (i) the converter and (ii) the at least one high discharge battery stack to a second output using the inverter;

supplying power to the customer load; and wherein if the first input is received from the primary power supply, then transmitting power across a first switch gate, which is normally closed, across a first isolation transformer to the converter, then to the inverter, and then across a second isolation transformer to the customer load;

wherein if the first input is received from the secondary power supply, then closing a second switch gate thereby electrically connecting the secondary power supply to the converter, adjusting the at least one converter power parameter such that power is transmitted from the secondary power supply to the converter to the at least one high discharge battery stack for charging the at least one high discharge battery; discharging power from the at least one high discharge battery stack to the inverter; and transmitting power to the customer load.

20. A method for conditioning and maintaining power transmitted to a customer load from at least one of a primary power supply and a secondary power supply, wherein the method comprises:

receiving a first input from at least one of (i) a primary power supply and (ii) a secondary power supply;

converting the first input from the at least one of (i) the primary power supply and (ii) the secondary power supply to a first output using a converter;

continuously adjusting at least one converter power parameter to satisfy at least one inverter power parameter;

determining whether the first output transmitted from the converter to an inverter satisfies the at least one inverter power parameter;

if the first output transmitted from the converter to the inverter satisfies the at least one inverter power parameter, then not charging and not discharging at least one high discharge battery stack;

if the first output transmitted from the converter fails to satisfy the at least one inverter power parameter, then discharging the at least one high discharge battery stack to supplement the converter output and maintain the inverter output within the at least one inverter power parameter;

converting a second input from at least one of (i) the converter and (ii) the at least one high discharge battery stack to a second output using the inverter;

wherein the at least one high discharge battery stack is at least 3 C;

supplying power to the customer load.

21. A method for conditioning and maintaining power transmitted to a customer load from at least one of a primary power supply and a secondary power supply, wherein the method comprises:

monitoring at least one primary power supply parameter;

generating a graphical display comprising (i) a real-time monitoring of the at least one power supply parameter, and (ii) at least one of (1) a minimum threshold level and a (2) maximum threshold level for the at least one power supply parameter;

determining whether the at least one primary power supply parameter fails to satisfy a respective primary power supply parameter threshold;

wherein determining whether the at least one primary power supply parameter fails to satisfy the respective primary power supply parameter threshold comprises receiving at least one first signal from at least one of (i) at least one first sensor in electrical communication with at least one processor and (ii) a remote processor communicatively coupled via a communications network to the at least one processor;

receiving a first input from at least one of (i) a primary power supply and (ii) a secondary power supply;

converting the first input from the at least one of (i) the primary power supply and (ii) the secondary power supply to a first output using a converter;

continuously adjusting at least one converter power parameter to satisfy at least one inverter power parameter;

determining whether the first output transmitted from the converter to an inverter satisfies the at least one inverter power parameter;

if the first output transmitted from the converter to the inverter satisfies the at least one inverter power parameter, then not charging and not discharging at least one high discharge battery stack;

converting a second input from at least one of (i) the converter and (ii) the at least one high discharge battery stack to a second output using the inverter;

supplying power to the customer load.

* * * * *